United States Patent [19]
Ogisu et al.

[11] Patent Number: 5,630,928
[45] Date of Patent: May 20, 1997

[54] PROCESS FOR PRODUCING RESIN PRODUCTS

[75] Inventors: Yasuhiko Ogisu, Nagoya; Shigeyuki Takahashi, Kuwana; Mamoru Kato, Nagoya, all of Japan

[73] Assignee: Toyoda Gosei Co., Ltd., Aichi-ken, Japan

[21] Appl. No.: 401,916

[22] Filed: Mar. 9, 1995

Related U.S. Application Data

[63] Continuation-in-part of Ser. No. 225,286, Apr. 8, 1994, Pat. No. 5,484,516.

[30] Foreign Application Priority Data

| Mar. 9, 1994 | [JP] | Japan | 6-038830 |
| Aug. 3, 1994 | [JP] | Japan | 6-182656 |

[51] Int. Cl.$^6$ ........................................ C25D 5/02
[52] U.S. Cl. .................... 205/118; 205/122; 205/164
[58] Field of Search ........................... 205/164, 166, 205/167, 183, 118, 120, 122

[56] References Cited

U.S. PATENT DOCUMENTS

| 4,170,524 | 10/1979 | Nakajyo et al. | 205/136 |
| 4,445,979 | 5/1984 | Lutfy et al. | 205/118 |
| 5,452,931 | 9/1995 | Chase | 293/115 |

FOREIGN PATENT DOCUMENTS

| 45-37843 | 12/1970 | Japan . |
| 48-16987 | 5/1973 | Japan . |
| 52-50937 | 4/1977 | Japan . |
| 55-152195 | 11/1980 | Japan . |
| 1149970 | 6/1989 | Japan . |
| 1215617 | 12/1970 | United Kingdom . |

*Primary Examiner*—Kathryn Gorgos
*Assistant Examiner*—Brendan Mee
*Attorney, Agent, or Firm*—Cushman, Darby & Cushman

[57] ABSTRACT

A resin product has a body made of a resin. The body has an outer surface including an ornamental surface and an unornamental surface, a first area defined on the outer surface, and a chemical plating layer and an electroplating layer respectively formed on the first area. A process for producing the resin product comprises the step of making a first boundary along a contour of the first area located on the ornamental surface, and the step of making a second boundary along a contour of the first area located on the unornamental surface. The step of making the second boundary includes forming a resist layer on the unornamental surface. The resist layer has a resistivity to a chemical plating solution for making the chemical plating layer. The process also includes the step of forming the chemical plating layer on the outer surface of the body except a part of the first boundary and the resist layer by chemical plating the body, and the step of selectively forming the electroplating layer on the chemical plating layer within the first area.

13 Claims, 28 Drawing Sheets

PROCESS FOR PRODUCING RESIN
PRODUCTS

This application is a continuation-in-part of the U.S. Pat. application Ser. No. 08/225,286 filed on Apr. 8, 1994, entitled RESIN PRODUCTS AND PROCESS FOR PRODUCING THE SAME, now U.S. 5,484,516.

BACKGROUND OF THE INVENTION

1. Field of the Invention

The present invention relates to a process for producing resin products. More particularly, the present invention relates to a process in which resin products are partially plated during their production, and a coating material used in their production.

2. Description of the Related Art

Automobile accessories such as front grilles and back panels have conventionally been produced by plating a resin base material. For example, in the case of the front grille, a plating layer is formed on a prescribed portion of the front ornamental surface of the grille, and a coating layer is formed on all portions other than the ornamental surface. This type of front grille is produced, for example, in the manner described below.

First, the decorative portion of the grille body made of ABS resin that requires plating is covered with a mask. Next, the grille body is spray coated with a resist coating while in that state. Then, a resist layer is formed on the portion not requiring plating. Next, the mask is removed from the grille body. After roughing the surface of the grille body by etching, chemical plating is performed on that surface. Then, a chemical plating layer is formed on the portion of the grille body surface on which the resist layer is not formed. Next, the grille body is subjected to an electroplating process including a plurality of steps. Consequently, an electroplating layer is formed on the chemical plating layer. Thus, a plating layer including a chemical plating layer and an electroplating layer is formed only on the portion of the grille body requiring plating.

Finally, the resist layer is overcoated with a prescribed coating in the state in which the portion other than the resist layer is covered with a mask.

In the above-mentioned prior art, however, since only the portion requiring plating is masked when the resist layer is formed, the resist layer is formed over the entire portion not requiring plating, regardless of whether it is the ornamental surface or unornamental surface of the front grille. Consequently, there were cases in which etching solutions and plating solutions ended up becoming contaminated when the resist layer was dissolved in these solutions.

SUMMARY OF THE INVENTION

Accordingly, it is an object of the present invention to provide a process for partial plating of resin products that enables inhibition of contamination of plating solutions by the resist layer as well as a remarkable reduction in the production cost.

To achieve the foregoing and other objects and in accordance with the present invention, there is provided a process for producing a resin product. The resin product has a body made of a resin. The body has an outer surface including an ornamental surface and an unornamental surface, a first area defined on the outer surface, and a chemical plating layer and an electroplating layer respectively formed on the first area.

The process comprises the steps of making a first boundary along a contour of the first area located on the ornamental surface and making a second boundary along a contour of the first area located on the unornamontal surface. The step of making the second boundary includes forming a resist layer on the unornamental surface. The resist layer has a resistivity to a chemical plating solution for making the chemical plating layer. The process also includes the steps of forming the chemical plating layer on the outer surface of the body except a part of the first boundary and the resist layer by chemical plating the body, and selectively forming the electroplating layer on the chemical plating layer within the first area.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

The following provides an explanation of a first embodiment of the present invention embodied in a front grille for vehicles with reference to FIGS. 1 through 15.

Figure 1:
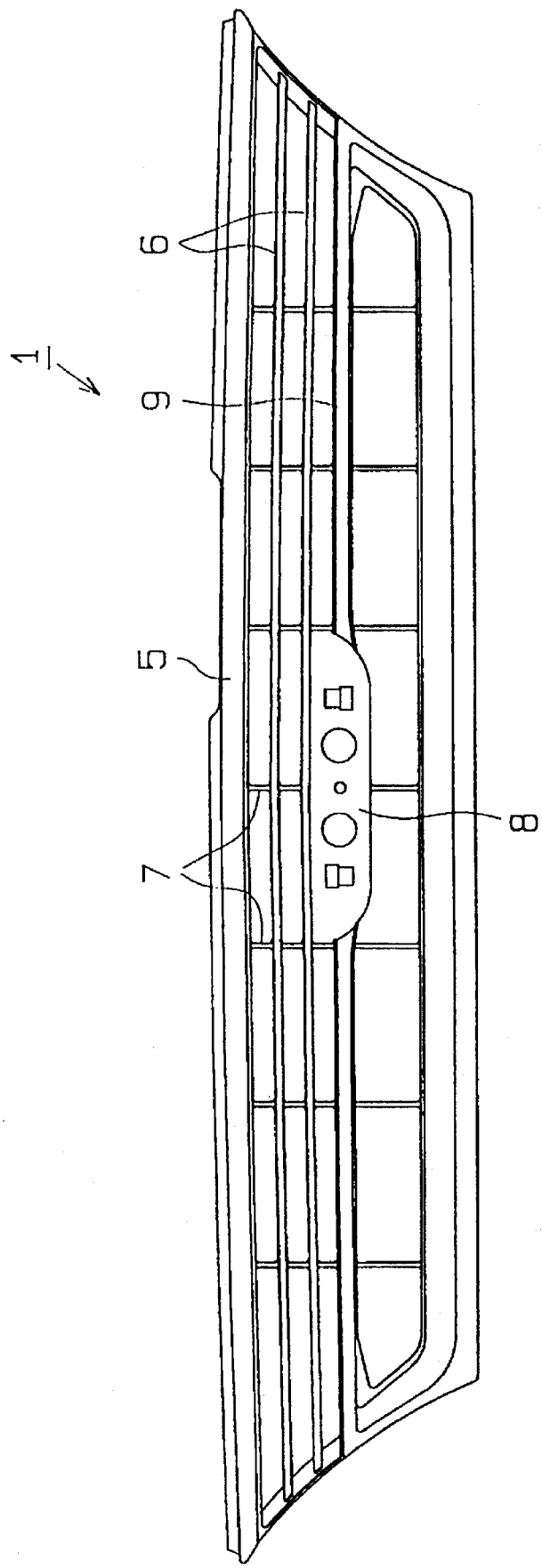
FIG. 1 is a front view showing a front grille embodying the present invention.

A front grille 1 is attached to the front of a vehicle as shown in FIG. 1. As shown in FIGS. 1 through 6, this front grille 1 is provided with a grille body 2 composed of a base material made of ABS resin. The front surface and side surfaces of the grille body 2 serve as an ornamental surface, while the rear surface serves as an unornamental surface. A plating layer 3 (netted portion in FIG. 2) is formed on a portion of an ornamental and an unornamental surfaces. In addition, a coating layer 4 is formed on the ornamental surface at a portion except the plating layer 3. A resist layer 13 is formed on the unornamental surface at a portion except the plating layer 3.

The front grille 1 is provided with a frame 5 having substantially a rectangular front surface, and a plurality of sub-partitions 6 that extend in the horizontal direction within the frame 5. The front grille 1 also has a plurality of connecting plates 7 extending in the vertical direction within the frame 5, a fitting plate 8 in the central portion for attaching a mark plate (not shown), and a main partition 9 extending from the frame 5 toward a fitting plate 8. The plating layer 3 is formed on the ornamental surface of the frame 5 and the ornamental surface of the main partition 9. The coating layer 4 is formed on the ornamental surfaces of sub-partition 6, fitting plate 8 and connecting plate 7.

Figure 3:
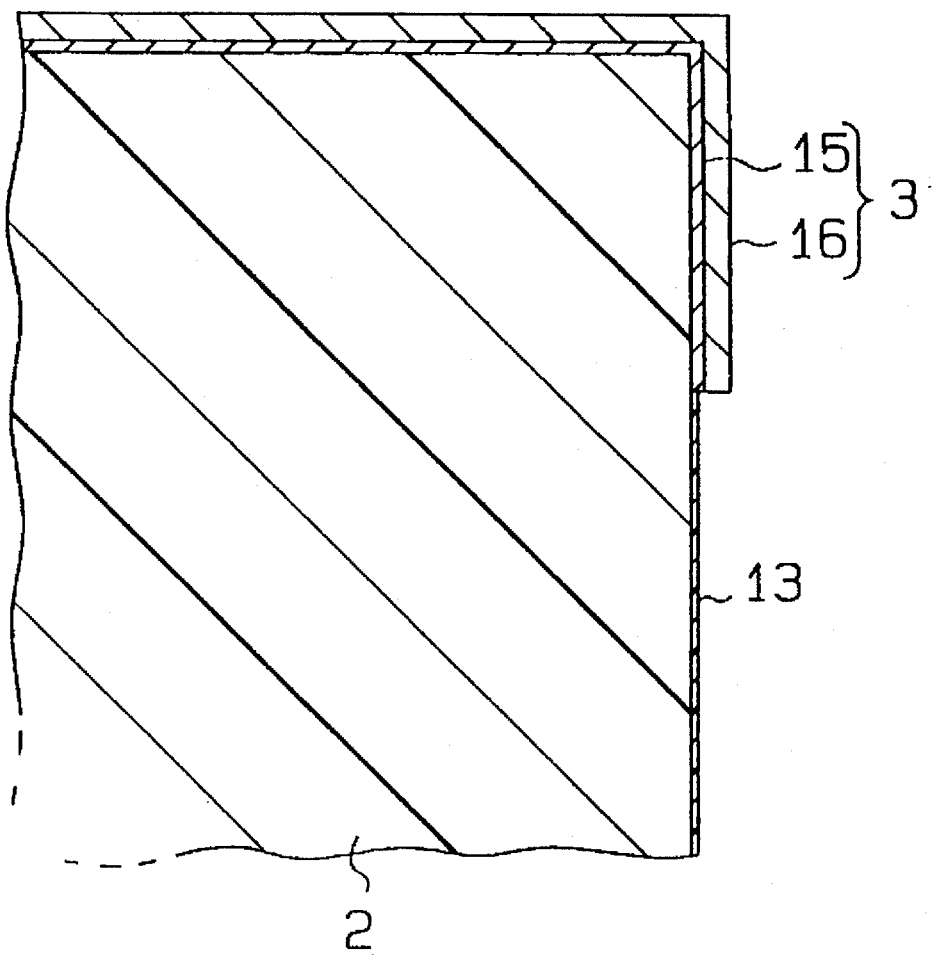
FIG. 3 shows in partially enlarged cross-section the portion β of FIG. 2.
Figure 4:
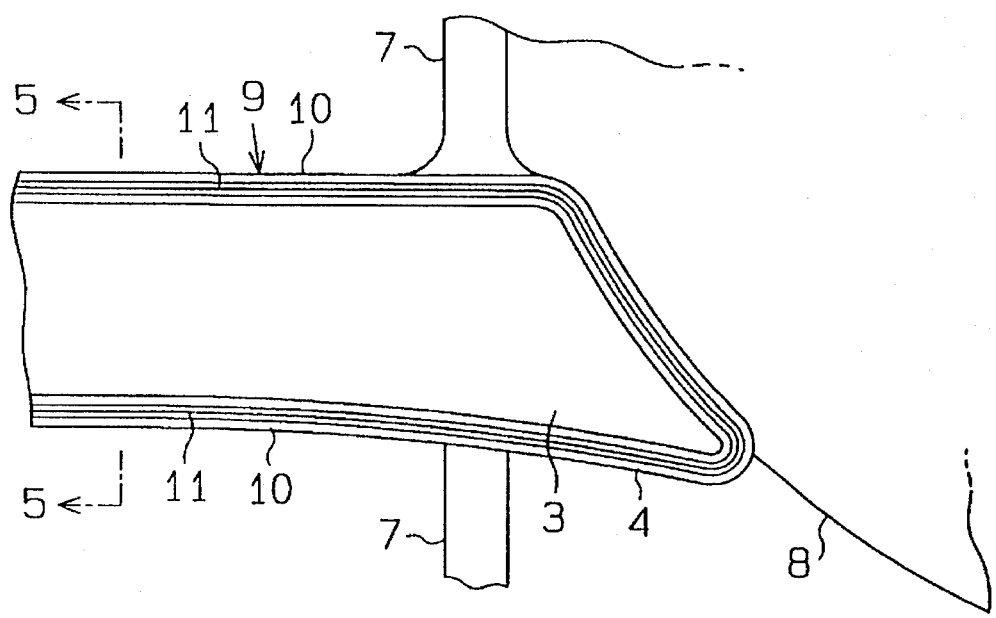
FIG. 4 shows in partially enlarged cross-section the portion α of FIG. 2.
Figure 5:
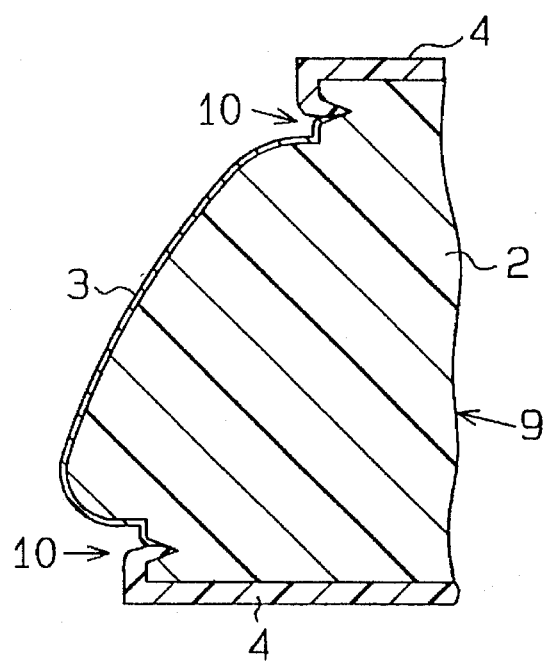
FIG. 5 is a cross-sectional view taken along the line 5—5 of FIG. 4.

FIG. 4 shows in enlarged front view a portion of main partition 9, namely the portion α of FIG. 3. FIG. 5 is a cross-sectional view taken along the line 5 5 of FIG. 4. As shown in FIGS. 4 and 5, a step section 10 is formed at the boundary of the plating layer 3 and coating layer 4 on the ornamental surface of grille body 2, extending upward and downward from the frame 5 and the main partition 9. The step section 10 is continuous so as to form a ring. A groove 11 or a first boundary having a substantially V-shaped cross-section is formed into the shape of a ring or a closed curve in the step section 10.

Figure 2:
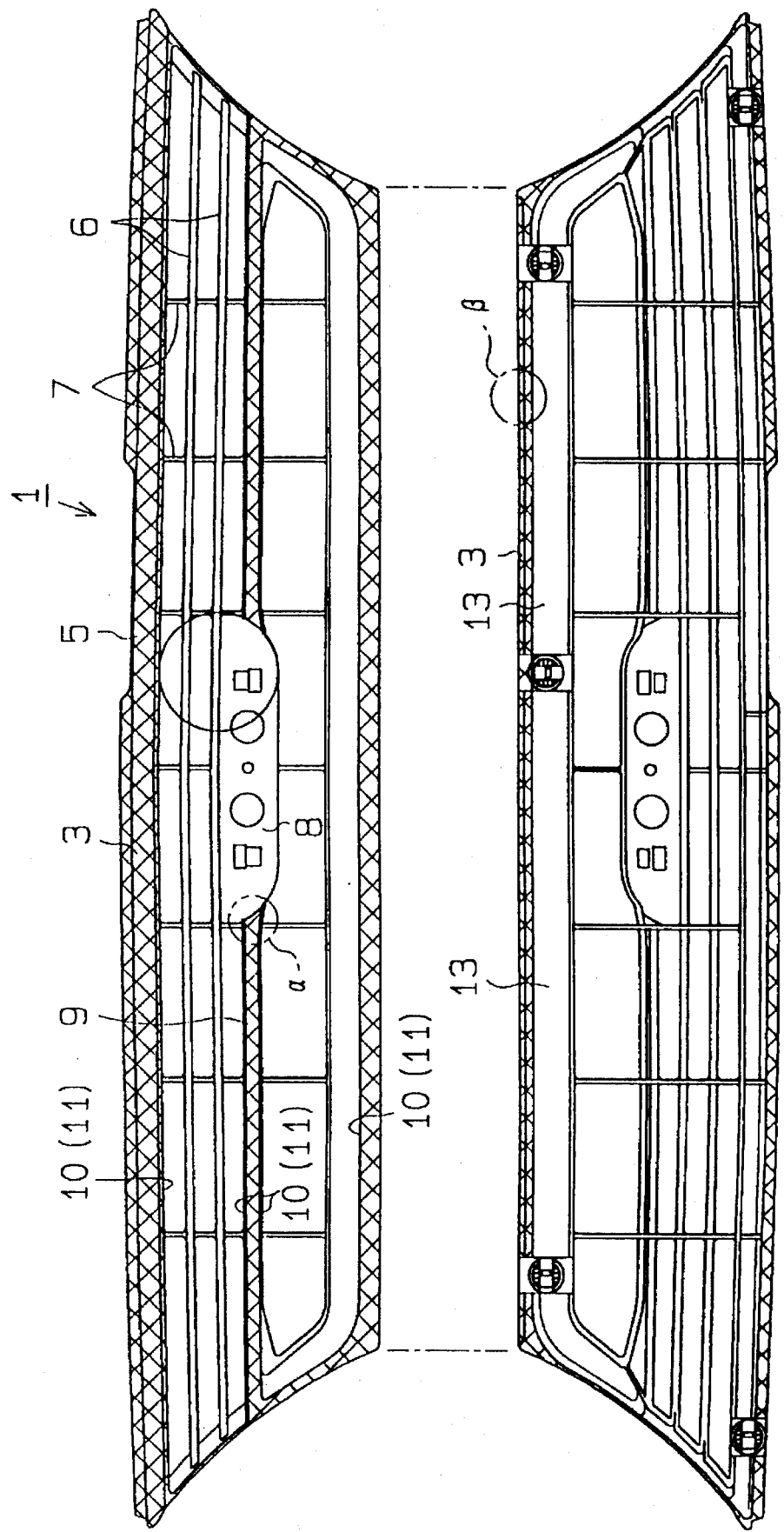
FIG. 2 is a schematic diagram showing the plated portions of the front grille of FIG. 1 in which the front and rear surfaces of the front grille are presented in a developed form.

FIG. 3 shows in enlarged cross-section the portion β of FIG. 2, and indicates a portion of the unornamental surface of front grille 1. The plating layer 3 extending from the ornamental surface is formed on a portion of the unornamental surface of grille body 2, while the resist layer 13 having resistivity to an acidic etching solution and a plating solution is formed on all other portions so that plating is not performed at those portions. An unillustrated electrode projection is formed on the rear surface of grille body 2.

Figure 6:
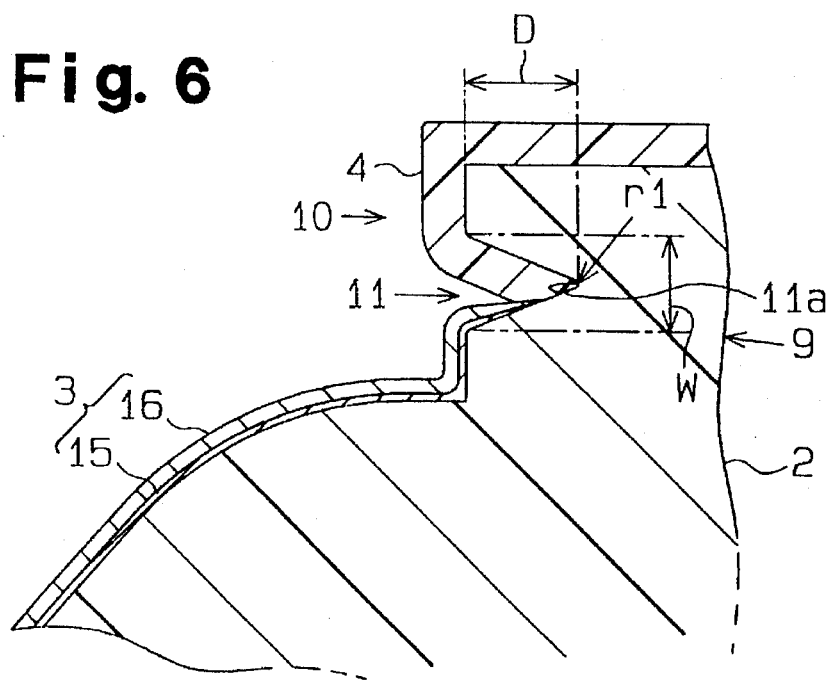
FIG. 6 shows in partial cross-section a portion of the ornamental surface of the main partition of the front grille of FIG. 1.

As shown in FIG. 6, the plating layer 3 includes a chemical plating layer 15 and an electroplating layer 16. In the present embodiment, the chemical plating layer 15 is formed of nickel to a thickness of about 0.3 to 0.4 µm. The electroplating layer 10 is formed of various metals to a thickness of about 20 to 50 µm. The plating layer 16 has a multi-layer structure, and is formed in the order of, for example, a strike plating layer of nickel, a copper plating layer, a semi-brilliant nickel plating layer, a brilliant nickel plating layer and a chrome plating layer (none of which are shown).

The following provides an explanation of the various types of plating solutions used for forming the electroplating layer 16. The plating solution for the strike plating layer contains 250 g/L of nickel sulfate, 30 g/L of nickel chloride and 30 g/L of boric acid. The plating solution for the copper plating layer contains 200 g/L of copper sulfate, 50 g/L of sulfuric acid, 0.01 g/L of hydrochloric acid and a trace amount of brightener. The plating solution for the semi-brilliant nickel plating layer contains 280 g/L of nickel sulfate, 45 g/L of nickel chloride, 40 g/L of boric acid and a trace amount of brightener. The plating solution for the brilliant nickel plating layer contains 240 g/L of nickel sulfate, 45 g/L of nickel chloride, 30 g/L of boric acid, a trace amount of brightener and a trace amount of additive. In addition, the plating solution for the chrome plating layer contains 250 g/L of chromic anhydride, 10 g/L of sodium silicofluoride and 1 g/L of sulfuric acid.

As shown in FIG. 6, a bottom 11a of the groove 11 is microscopically curved due to factors relating to molding. In the present embodiment, the radius of curvature r1 in the cross-section of bottom 11a is less than 0.1 mm.

The size of the groove 11 is, for example, such that width W is 0.5 mm and depth D is 0.7 mm. Although there are no particular limitations on width W, it is preferably at least 0.3 mm due to limitations on forming, and preferably 1.0 mm or less with respect to attempting to improve the ornamental. In addition, although there are also no particular limitations on depth D, it is preferably at least 0.3 mm due to limitations on forming. Moreover, in the present embodiment, the ratio of depth D to width W (D/W) is larger than 1.0. The ratio and radius of curvature r1 are set to satisfy the following equation (1):

$$D/W > 0.18*r + 1.0 \tag{1}$$

where, "r" represents the relative value of radius of curvature in which $r = r1(mm)/1(mm)$.

Figure 7:
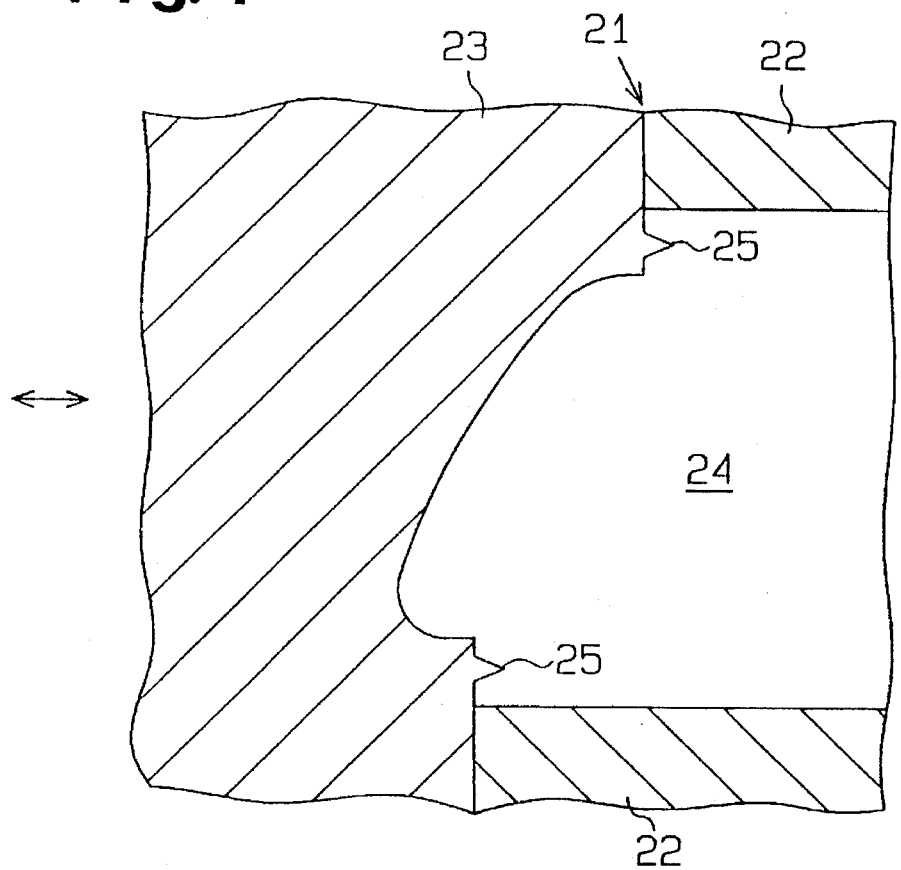
FIG. 7 shows in enlarged cross-section a portion of the mold for forming the ornamental surface of the grille body of FIG. 1.
Figure 8:
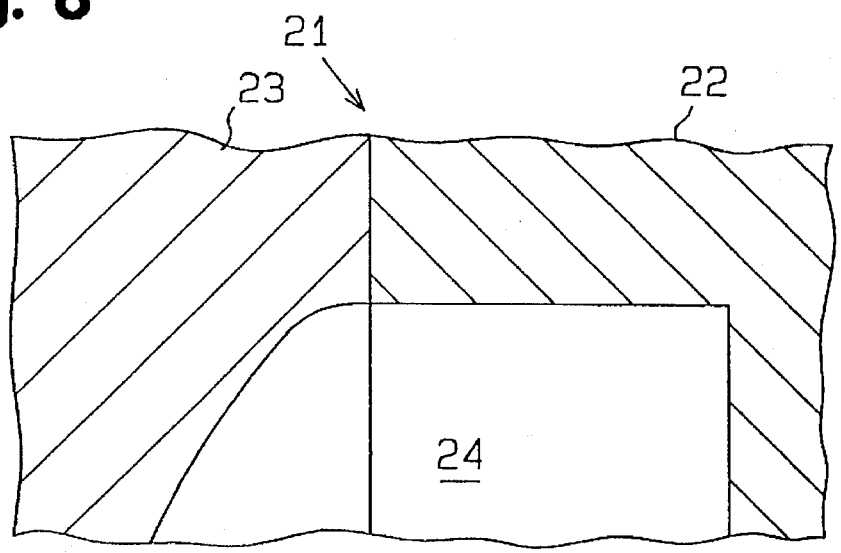
FIG. 8 shows in enlarged cross-section a portion of the mold for forming the unornamental surface of the grille body of FIG. 1.

Next, a mold 21 for forming the grille body 2 will be described. FIG. 7 is a cross-sectional view showing a portion of mold 21, which corresponds to a portion of the ornamental surface of main partition 9. FIG. 8 is a cross-sectional view showing a different portion of the mold, which corresponds to a portion of the unornamental surface of frame 5 of the grille body 2. The mold 21 comprises a fixed die 22 and a movable die 23, and a cavity 24 for molding the grille body 2. As shown in FIG. 7, however, in the present embodiment, a ridge 25 for forming the groove 11 is integrally formed with the movable die 23 at a portion for forming the ornamental surface. On the contrary, as shown in FIG. 8, this type of ridge 25 is not formed on the fixed die 22 for forming the unornamental surface.

Next, a description is provided regarding a process for producing the front grille 1.

First, melted ABS resin is filled into the cavity 24 by injecting in accordance with known molding methods (see FIGS. 7 and 8). When the resin cools and solidifies, both dies 22 and 23 are opened and the grille body 2 is removed. Both dies 22 and 23 are opened in parallel with the direction of mold opening, namely the direction in which the ridge 25 is extracted from the molded article. Consequently, mold opening is not obstructed by the ridge 25, thereby allowing the grille body 2 to be easily removed from the mold. Thus, the grille body 2 is obtained in which the groove 11 is formed into the shape of a loop on the ornamental surface.

Figure 9:
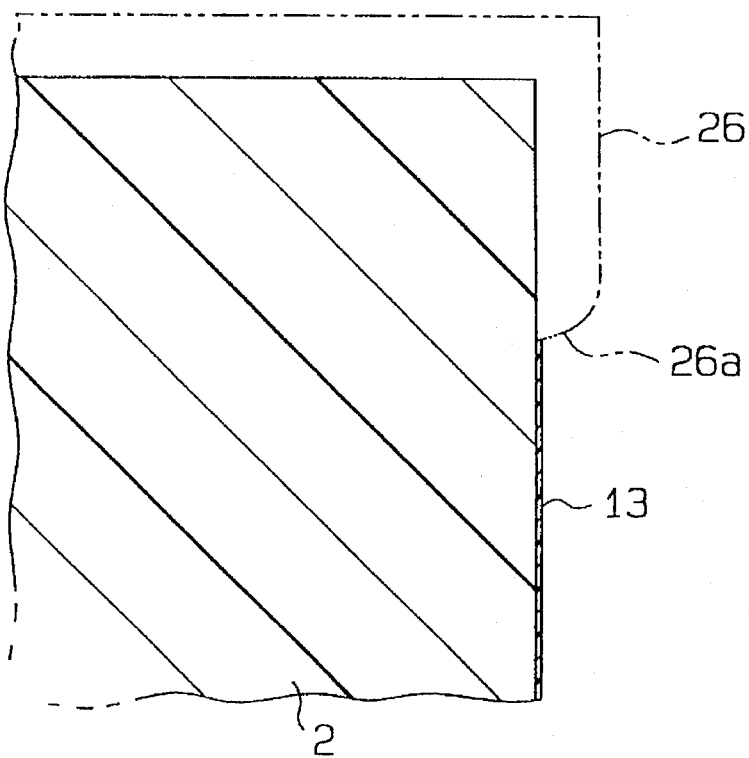
FIG. 9 shows in partial cross-section the state in which a resist layer is formed on the unornamental surface of the grille body of FIG. 1.

Subsequently, a resist coating is performed on the grille body 2 at the portion that does not require plating. In this coating process, portions of the ornamental and unornamental sides on which plating is to be performed are first covered with a first mask 26 as shown in FIG. 9 so that the resist coating does not adhere to those portions. The mask 26 is a metal plate having a thickness of several millimeters, and has a shape that approximates the shape of the front grille 1. In addition, the mask 26 is provided with an opening 26a required for forming the resist layer 13. Thus, when the mask 26 is attached to the grille body, the portion necessary for coating of resist on the unornamental side is exposed. If the resist coating is then applied by, for example, spray coating toward the exposed portion, the resist layer 13 is formed as shown in FIG. 9.

Figure 10:
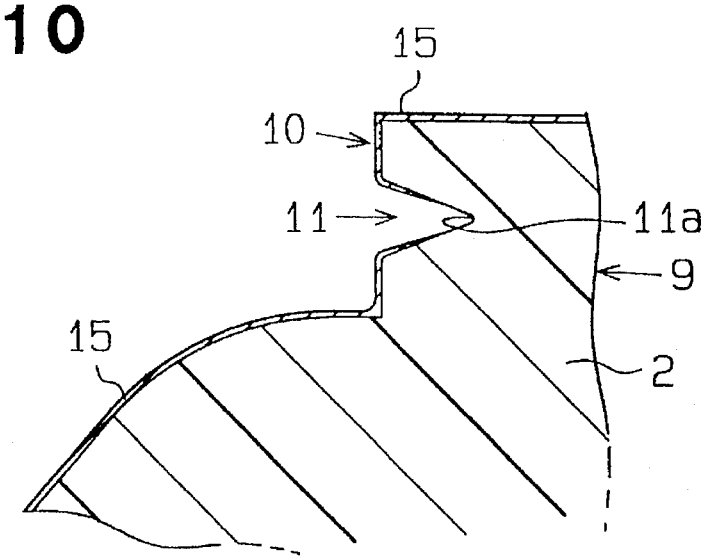
FIG. 10 shows in partial cross-section the state in which chemical plating has been performed on the ornamental surface of the grille body of FIG. 7.
Figure 11:
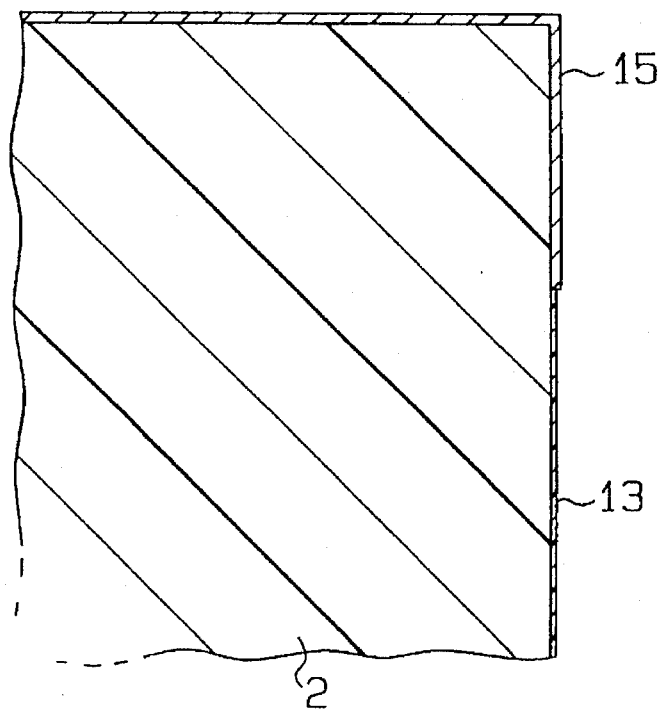
FIG. 11 shows in partial cross-section the state in which chemical plating has been performed on the unornamental surface of the grille body of FIG. 9.

Next, the grille body 2 having the resist layer 13 is subjected to an etching process where the surface of resist layer 13 is removed and the surface of grille body 2 is roughened. At this time, since the resist layer 13 has resistance to the acidic etching solution, it hardly dissolves in the etching solution. Following this, the grille body 2 is immersed in a chemical plating solution to perform chemical plating. At this time, as shown in FIG. 10, the plating solution does not teach the bottom 11a of groove 11 because of its narrow width. Thus, plating is not performed on this bottom 11a. As shown in FIG. 11, plating is also not performed on the resist layer 13. This is because that the resist layer does not have an affinity to the chemical plating solution. Thus, the chemical plating layer 15 is formed over the substantially entire surface of grille body 2 other than the bottom 11a of groove 11 and the surface of resist layer 13.

Further, the grille body 2, on which the chemical plating layer 15 has been formed, is also subjected to electroplating. The electroplating process has a plurality of steps including strike plating, copper plating, semi-brilliant nickel plating, brilliant nickel plating and chrome plating. The grille body 2 is immersed for a multiple number of times in each of the prescribed electroplating solutions, after which current is applied to those portions requiring plating in each of the plating solutions. Those portions are mainly the front surface of frame 5 and the front surface of main partition 9. At this time, the above-mentioned projection formed on the rear surface of the grille body 2 is used as one electrode.

Figure 12:
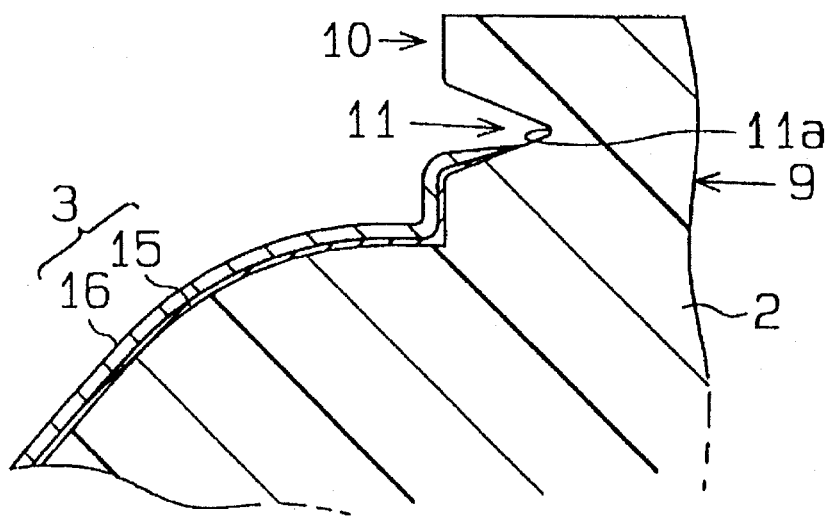
FIG. 12 shows in partial cross-section the state in which electroplating has been performed on a grille body on which the chemical plating layer has been formed.

Then, the chemical plating layer 15, formed on the portion not requiring decorative plating, is dissolved by the electroplating solution (see FIGS. 10 and 12). In addition, the electroplating layer 16 with the multi-layer structure is formed on the surface of chemical plating layer 15 at the portion requiring decorative plating. Since the chemical plating layer 15 is not formed on the resist layer 13 on the unornamental surface side shown in FIG. 11, the electroplating layer 16 is also not formed on that layer. Thus, as shown in FIG. 12, the plating layer 3 including the chemical plating layer 15 and electroplating layer 16 is only formed at the portion requiring decorative plating.

Figure 13:
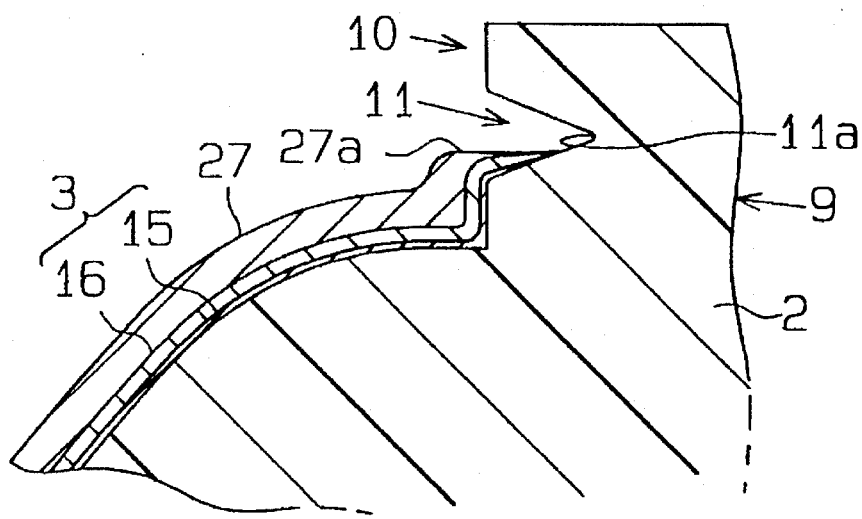
FIG. 13 shows in partial cross-section the state in which the portion of the grille body on which the plating layer has been formed on the ornamental surface is covered with a mask.
Figure 14:
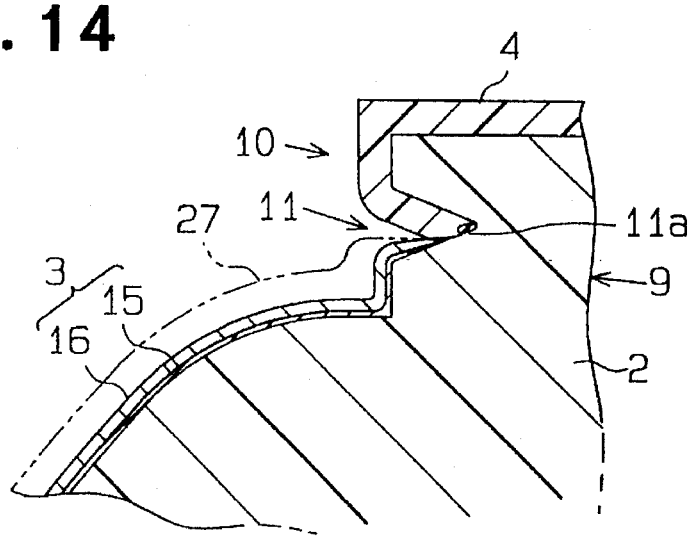
FIG. 14 shows in partial cross-section the state in which a coating layer is formed on the ornamental surface of a grille body that is covered with the mask.
Figure 15:
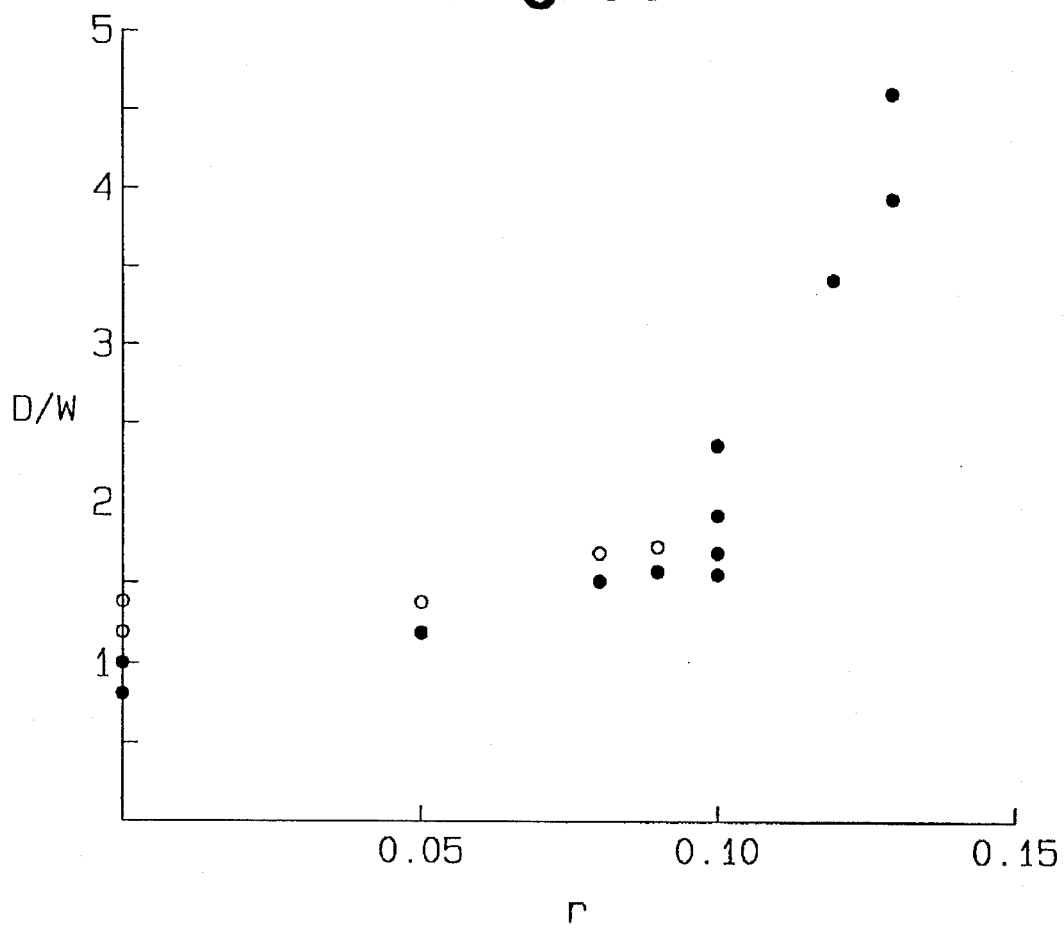
FIG. 15 is a graph showing the results of judging whether or not partial plating can be performed in the case of forming a grille body while making various changes in the radius of curvature of the cross-sectional curved portion of the bottom of a groove and the ratio of the depth to width.

Thereafter, as shown in FIG. 13, the portion at which the plating layer 3 is formed is covered by a second mask 27. The second mask 27 also approximates the shape of front grille 1 in the same manner as the first mask 26. An opening 27a, which is opened for forming the coating layer 4, is formed in the second mask 27. When the second mask 27 is attached to the grille body 2, the portion required for forming the coating layer 4 is exposed from the opening 27a. Spray coating is then performed toward the exposed portion. As a result, the prescribed coating layer 4 shown in FIG. 14 is formed.

After the coating layer 4 is formed, the front grille 1 shown in FIGS. 1 and 6 is obtained by removing the mask 27 from the grille body. The grille 1 has the plating layer 3 on the ornamental surface of the frame 5 and the ornamental surface of main partition 9. The grille 1 also has the coating layer 4 on the ornamental surfaces of sub-partition 6, fitting plate 8 and connecting plate 7. The grille further has the resist layer 13 on the portion of the unornamental surface on which the plating layer 3 is not formed.

According to the present embodiment, when the chemical plating layer 15 is formed, the bottom 11a of groove 11 and the resist layer 13 are not chemically plated as shown in FIG. 10. Consequently, when the electroplating layer 16 is formed, current is applied only to the portion requiring decorative plating. The chemical plating layer 15, formed on the portion not requiring decorative plating, can be dissolved by electroplating solution as being clear from FIGS. 10 and 12.

With respect to the portion requiring decorative plating, the electroplating layer 16, demonstrating a multi-layer structure, is formed on the surface of chemical plating layer 15 as shown in FIG. 12. Thus, the grille body 2 is obtained in which plating layer 3 is reliably formed only at the desired portion.

As shown in FIG. 14, the coating layer 4 can be directly formed on the grille body 2 without a primer layer in between. Thus, all layers can be formed in thin layers on the ornamental surface. This improves the appearance and quality of the grille 1. Since both coating layer 4 and grille body 2 are made of a resin material, the coating layer 4 can be strongly joined to the grille body 2. Thus, the durability of this joined portion can be improved.

Moreover, in the present embodiment, the groove 11 on the ornamental surface constitutes a boundary between the coating layer 4 and the plating layer 3. Consequently, both the layers can be distinctly separated thereby further improving the appearance.

In addition, in the present embodiment, the resist layer 13 is only formed on the unornamental surface side. Consequently, compared to the case of forming the resist layer 13 on both the ornamental surface and unornamental surface sides, the coated area can be reduced. Thus, the amount of resist layer 13 dissolved in the plating solution in each of the plating steps can also be reduced. This results in reducing the degree of contamination of the plating solution.

In the present embodiment, the groove 11 having a substantially V-shaped cross-section is only formed in the ornamental surface of front grille 1. Consequently, the ridge 25 for forming the groove 11 only needs to be formed on the movable die 23. This facilitates the producing of mold 21, and enables its production cost to be reduced considerably.

Moreover, in the present embodiment, the resist layer 13 is only formed on the unornamental surface of grille body 2. Thus, even if the edge of resist layer 13 happened to be formed irregularly or the boundary was formed in a zigzag manner, it would not be visible from the outside, thereby not impairing the appearance.

The following provides an explanation of an additional effect in the present embodiment. The test was carried out to examine the influence by the shape of groove 11 when the plating layer 3 was formed. In the test, it was judged whether the plating layer 3 can be reliably formed only on the portion requiring plating, while the shape of groove 11 was varied. The results will be described below.

The grille body 2 was molded with varied radius of curvature r1 of the curved portion of bottom 11a of groove 11, and the ratio of the depth D to the width W (D/W). In order to determine the possibility of partial plating of the grille body 2, the graph shown in FIG. 15 was prepared based on data from the above-mentioned two parameters. In this graph, white dots indicate that the plating layer 3 was able to be reliably formed only on the portion requiring plating; whereas black dots indicate that the plating layer 3 was unable to be formed only at the portion requiring plating. The failure is due to the formation of the chemical plating layer 15 at the bottom 11a of groove 11.

In the case of satisfying the above-mentioned requirements, i.e., r1<0.1, r=r1/1, and D/W>0.18*r+1.0, the plating layer 3 was able to be reliably formed only on the portion requiring decorative plating. The required plating layer 3 was unable to be formed when the above-mentioned requirements were not satisfied.

However, if the radius of curvature of the tip of ridge 25 is set to be zero, there are disadvantages in which the tip of ridge 25 may break or reduce the tolerance. In addition, forming of this type of ridge 25 becomes troublesome and laborious. Thus, it is preferable to set radius of curvature r1 to a value larger than zero in the light of easy production.

Next, a second embodiment of the present invention will be described referring to FIGS. 16 and 17. It should be noted that the major part of the present invention is substantially the same as in the first embodiment, so that the difference will mainly be described.

In this second embodiment, the forming of V-shaped groove 11 in the ornamental surface of grille body 2 is similar to in the first embodiment. However, the configuration with respect to the unornamental surface differs from the first embodiment.

Figure 16:
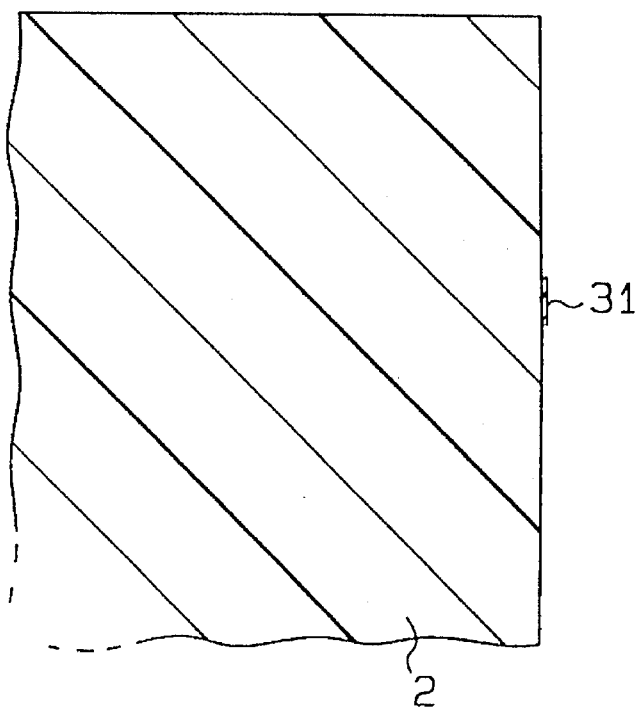
FIG. 16 shows in partial cross-section the state in which a band-shaped resist layer has been formed on the unornamental surface of the grille body in a second embodiment of the present invention.
Figure 17:
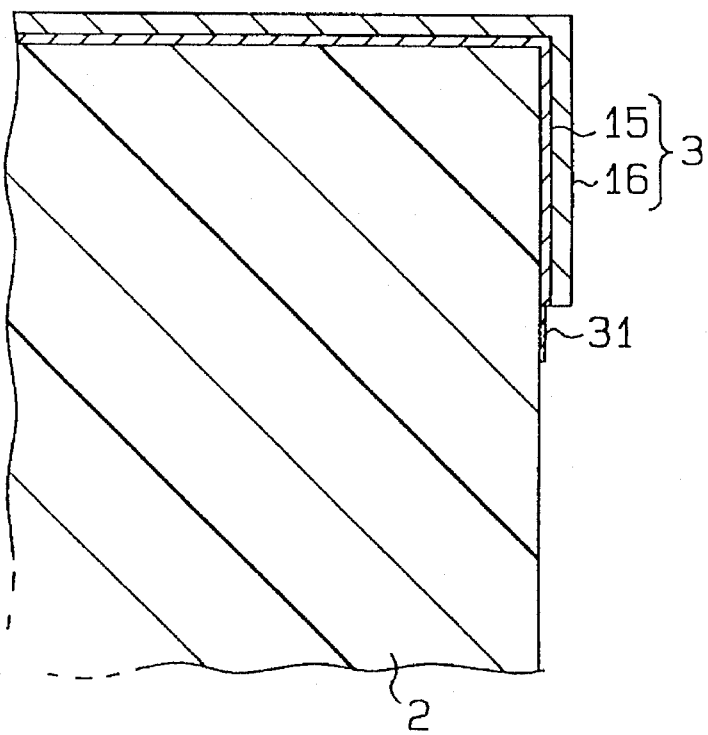
FIG. 17 shows in partial cross-section the state in which electroplating has been performed on the unornamental surface of the grille body on which a chemical plating layer has been formed in the second embodiment.

More specifically, as shown in FIG. 16, there is no forming of a resist layer over the entire portion that is not plated on the unornamental surface of grille body 2. In the second embodiment, the grille body 2 is first obtained in the same manner as in the first embodiment using the above-mentioned mold 21. Next, a band-shaped or linear resist layer 31 is formed on the grille body 2 to create a boundary in the form of a closed loop between a to-be-plated portion and a to-be-unplated portion. The boundary surrounds the to-be-unplated portion.

Next, the grille body 2 provided with the band-shaped resist layer 31 is immersed in a chemical plating solution to perform chemical plating. At this time, the bottom 11a of groove 11 and the resist layer 31 are not plated. The chemical plating layer 15 shown in FIG. 17 is formed on the remaining portion.

The grille body 2, on which the chemical plating layer 15 is formed, is then subjected to electroplating. Consequently, the chemical plating layer 15 formed on the to-be-unplated portion is dissolved by the electroplating solution as shown in FIG. 17. The electroplating layer 16 demonstrating a multi-layer structure is formed on the surface of chemical plating layer 15 at the to-be-plated portion. Since current does not pass through the resist layer 31 on the unornamental surface and the portion surrounded by the resist layer 31, the electroplating layer 16 is not formed thereon. In this case as well, the grille body 2 is obtained in which the plating layer 3 including the chemical plating layer 15 and the electroplating layer 16 is formed only at the to-be-plated portion, in substantially the same manner as in the first embodiment.

According to the second embodiment, demonstrated effects are basically the same as in the first embodiment in which the resist layer 31 was formed over the entire portion of the unornamental surface or to-be-unplated portion, in the second embodiment, the band-shaped resist layer 31 was formed to surround the to-be-unplated portion. Accordingly, the amount of coating used to form the resist layer 31 can be further reduced. This results in further reducing the amount of resist coating that dissolves in the plating solution in each of the plating steps. This also can reduce the degree of contamination of the plating solution.

Next, a third embodiment of the present invention will be described by focusing primarily on differences with each of the above-mentioned embodiments with reference to FIGS. 18 through 23.

Figure 18:
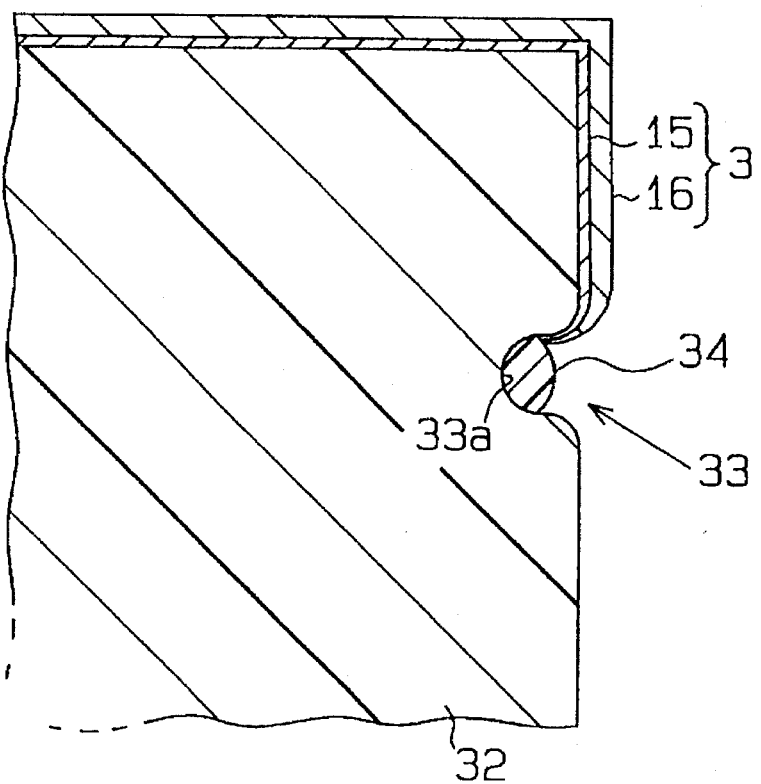
FIG. 18 shows in partial cross-section a portion of the unornamental surface of a front grille in a third embodiment of the present invention.

In the third embodiment, as shown in FIG. 18, a groove 33 is formed on the unornamental surface of a grille body 32. The groove 33 has a substantially U-shaped cross-section and is formed in the shape of a closed loop at the boundary between a portion on which a plating layer 3 is formed and a portion on which it is not formed. Moreover, a resist layer 34 is formed on a bottom 33a of the groove 33. These points differ considerably from the first and second embodiments. There are no particular limitations on the shape of cross-section, width, and depth of the groove 33 provided it is easily formed. It is preferably that the width and depth be, for example, about 2 to 3 mm. If the groove has an U-shaped cross-section, a preferable radius of the curvature of the bottom 33a is one half width, or in the range of 1 to 1.5 mm. The configuration on the ornamental surface of grille body 32 of this embodiment is identical to that of the first embodiment.

Figure 19:
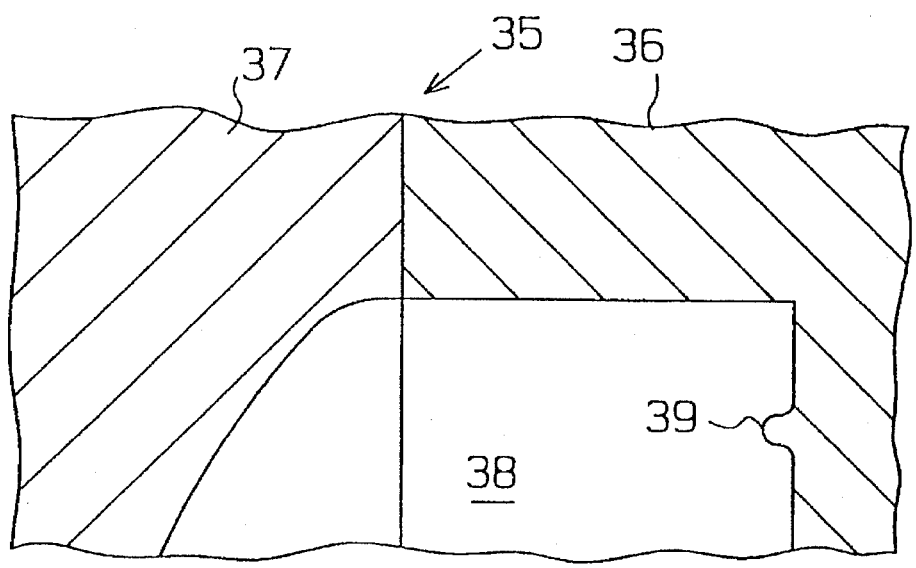
FIG. 19 shows in enlarged cross-section a portion of the mold for forming the grille body in the third embodiment.

Next, a mold 35 for forming the grille body 32 will be described. FIG. 19 is a cross-sectional view showing the portion of mold 35 for forming a portion of the unornamental surface of the frame of grille body 32. As shown in this figure, the mold 35 is equipped with a fixed die 36 and a movable die 37. A cavity 38 is formed by these dies 36 and 37 for molding the grille body 32.

As previously explained in the first embodiment, however, the ridge 25 (omitted in FIG. 19) for forming the V-shaped groove 11 is formed integrally with the portion of movable die 37 for forming the ornamental surface. As shown in FIG. 19, this type of ridge 25 is not formed on the portion for forming the unornamental surface. Instead, a ridge 39 having a substantially arc-shaped cross-section is formed on the fixed die 36 for forming the above-mentioned groove 33. It should be noted that since the leading edge of this ridge 39 is formed to be round, it is formed more easily than the sharp ridge 25 for the ornamental surface during mold forming.

Next, the action and effect of the present embodiment will be described.

Figure 20:
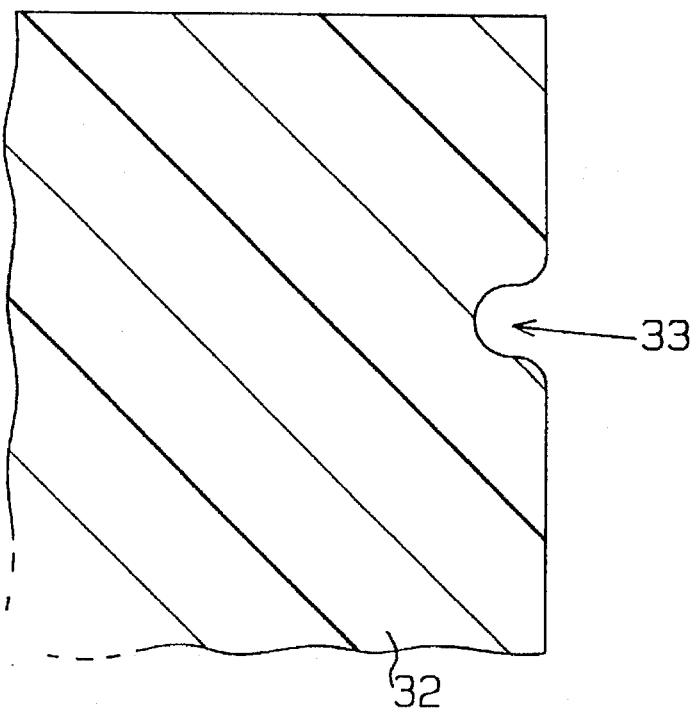
FIG. 20 shows in cross-section the unornamental surface of the grille body in the third embodiment.

First, similar to the first embodiment, ABS resin, which has been melted in a cavity 38, is filled by injection (see FIG. 19). Once the resin has cooled and solidified, both dies 36 and 37 are opened and the grille body 32 is removed. Consequently, the grille body 32 is obtained provided with the loop-shaped groove 11 on the ornamental surface (see FIG. 10) and the loop-shaped groove 33 on its unornamental surface as shown in FIG. 20.

Figure 21:
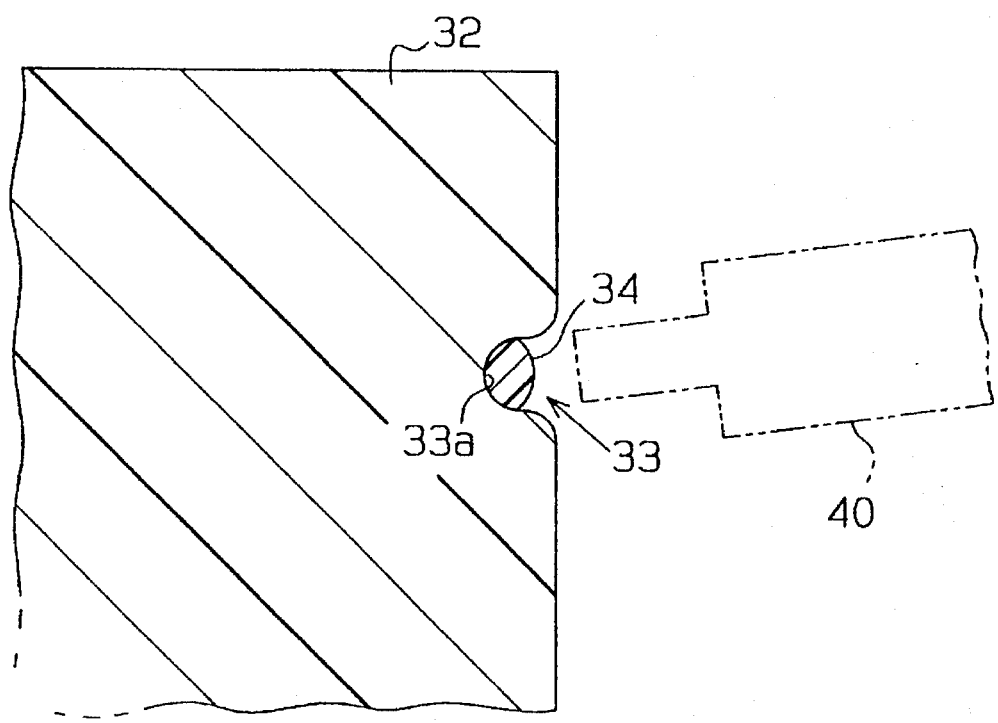
FIG. 21 shows in cross-section the state in which a resist layer is formed in the groove of the unornamental surface of the grille body in the third embodiment.

Subsequently, the resist layer 34 is formed on the grille body 32. In this case, for example, an injector 40 containing a resist coating inside is moved along the groove 33, while injecting the resist coating into the bottom 33a of groove 33 as shown in FIG. 21. Then, the resist layer 34 is continuously formed on the bottom 33a of groove 33.

Figure 22:
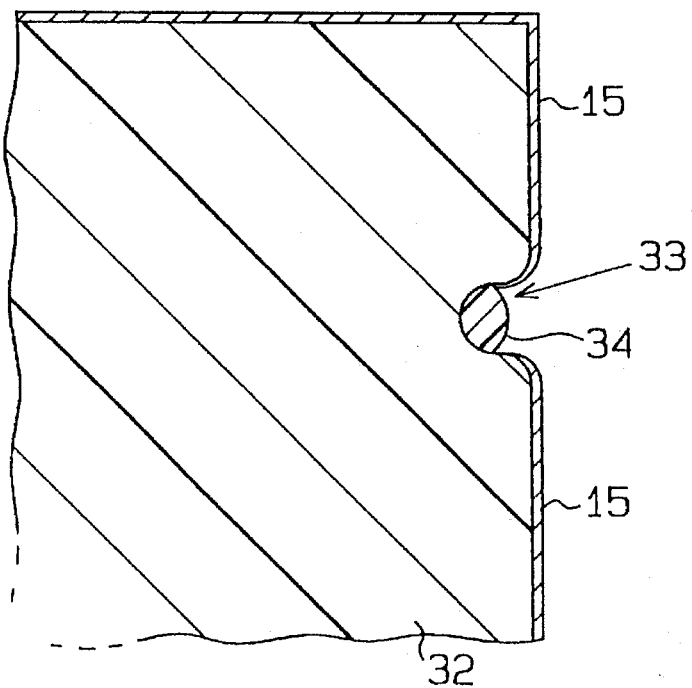
FIG. 22 shows in cross-section the unornamental surface of a grille body on which chemical plating has been performed in the third embodiment.
Figure 23:
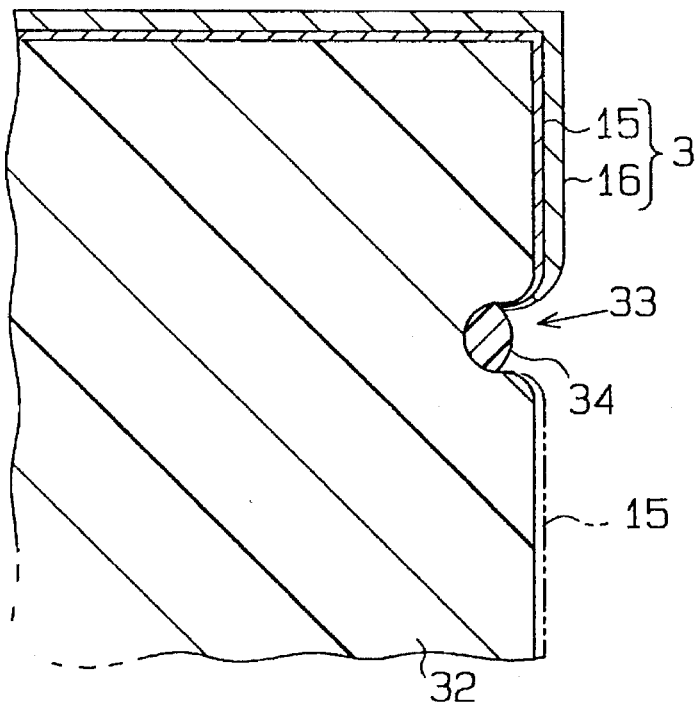
FIG. 23 shows in cross-section the unornamental surface of a grille body on which electroplating has been performed in the third embodiment.
Figure 24:
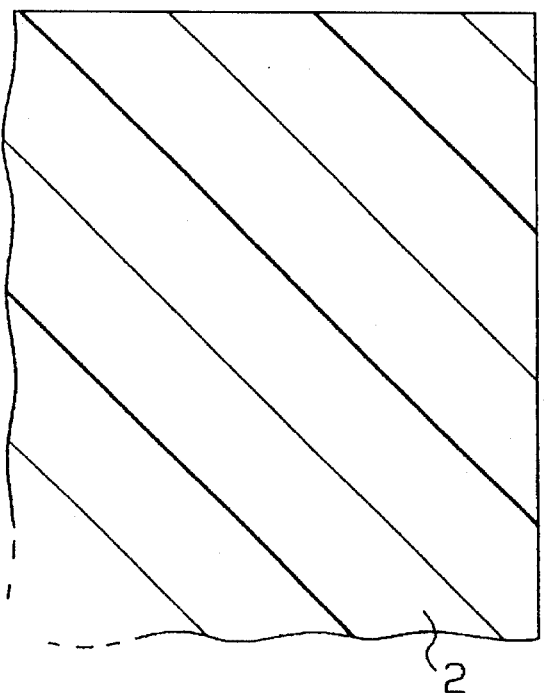
FIG. 24 shows in cross-section the unornamental surface of a grille body in a fourth embodiment of the present invention.

Next, the grille body 32, on which is formed the resist layer 34, is immersed in the chemical plating solution to perform chemical plating. At this time, the bottom 11a of groove 11 shown in FIG. 10 and the portion on which the resist layer 34 is formed shown in FIG. 22 are not plated, while a chemical plating layer 15 shown in FIG. 22 is formed on the remaining portions.

Moreover, the grille body 32, on which the chemical plating layer 15 has been formed, is subjected to electroplating. Consequently, the chemical plating layer 15 at the to-be-unplated portion is dissolved by the electroplating solution as indicated with the two-dot chain lines in FIG. 23. Since current does not pass through the resist layer 34 of the unornamental surface as well as the portion surrounded by the resist layer 34, no electroplating layer 16 is formed thereon. An electroplating layer 16 having a multi-layer structure is formed on the surface of chemical plating layer 15 at the to-be-plated portion shown in FIG. 23.

Thus, the grille body 32 is obtained provided with the plating layer 3 including the chemical plating layer 15 and the electroplating layer 16 only at the to-be-plated portion in substantially the same manner as the first and second embodiments.

The third embodiment demonstrates substantially the same effects as the first embodiment. According to the present embodiment, differing from the first embodiment in which the resist layer 31 was formed over the entire portion of the unornamental surface to be plated, the resist layer 34 was formed by injecting so as to surround the to-be-unplated portion. This results in reducing the amount of resist coating. As a result, the amount of coating that dissolves from the resist layer 34 in the plating solution during the plating process can be further reduced in the same manner as in the second embodiment. Contamination of the plating solution can also be further reduced.

Further, when forming the layer 34, the resist coating only needs to be injected along the U-shaped groove 33. Consequently, formation of resist layer 34 can be performed easily. Moreover, the risk of forming the resist layer 34 in crooked fashion can also be prevented, thereby enabling the resist layer 34 to be formed with high precision along a required line. Thus, the plating can be made to demonstrate favorable parting even on the unornamental surface.

Next, an explanation is provided of a fourth embodiment of the present invention focusing primarily on its differences from the previous embodiments with reference to FIGS. 24 through 27.

Figure 27:
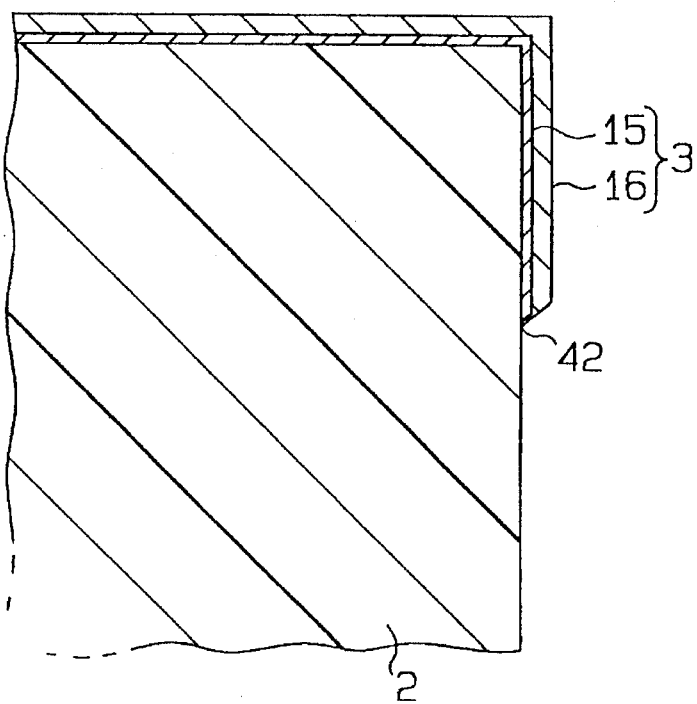
FIG. 27 is a cross-sectional view of a grille body showing the state in which electroplating has been performed after forming the notch in the fourth embodiment.
Figure 28:
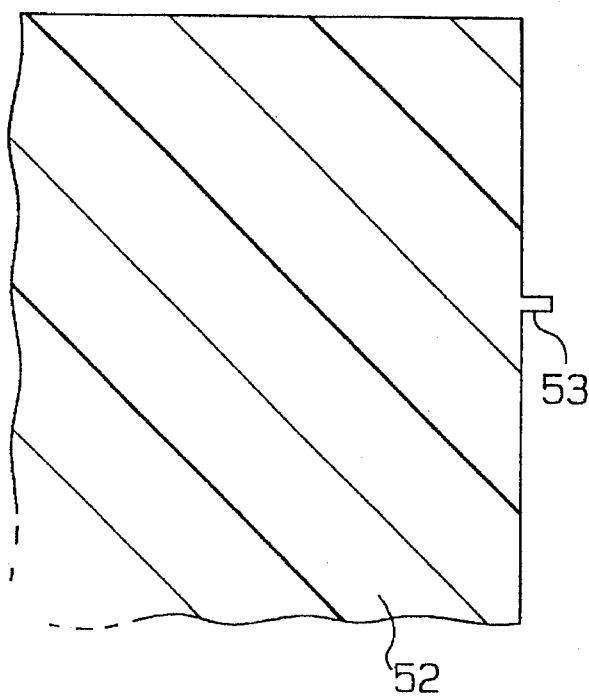
FIG. 28 shows in cross-section a ridge on the unornamental surface of a grille body in a fifth embodiment of the present invention.

As shown in FIG. 27, the fourth embodiment differs considerably from the first through third embodiments with respect to the resist coating not being applied to the unornamental surface of grille body 2 used in the first embodiment.

Figure 25:
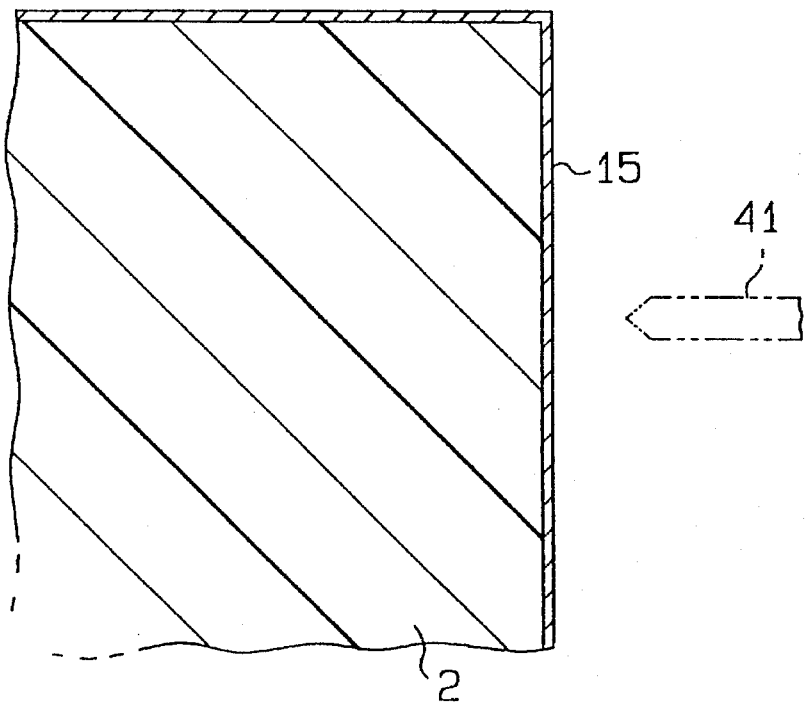
FIG. 25 is a cross-sectional view of a grille body showing the state immediately before making a notch with a cutting tool after forming a chemical plating layer on the unornamental surface in the fourth embodiment.

In this embodiment, the grille body 2, which is similar to the one used in first embodiment (see FIG. 24), is first obtained using the above-mentioned mold 21. Next, the grille body 2 is immersed in a chemical plating solution to perform chemical plating. At this time, a chemical plating layer 15 is formed on all portions excluding the bottom 11a of groove 11. Thus, the chemical plating layer 15 is formed over the entire unornamental surface of grille body 2 as shown in FIG. 25.

Figure 26:
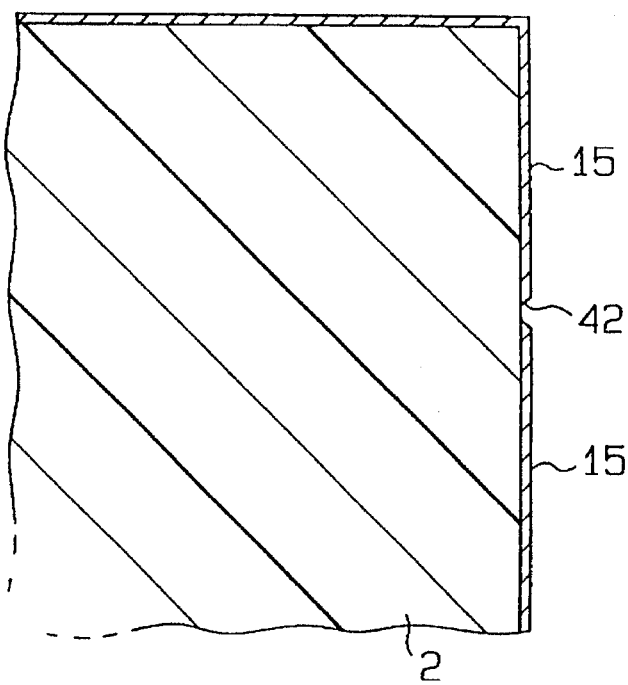
FIG. 26 is a cross-sectional view of a grille body showing the state in which a notch has been formed in a chemical plating layer in the fourth embodiment.

Subsequently, a loop-shaped notch 42 shown in FIG. 26 is made on the grille body 2 at a boundary between the to-be-plated portion and the to-be-unplated portion using a cutting tool 41 shown in FIG. 25.

The grille body 2 on which the notch 42 is formed is subjected to electroplating. Then, since current does not pass through the chemical plating layer 15 on the to-be-unplated portion, as shown in FIG. 27, the electroplating layer 16 is not formed on its upper surface, but rather is dissolved by the electroplating solution. An electroplating layer 16 having a multi-layer structure is formed on the surface of chemical plating layer 15 at the to-be-plated portion. Even if done in this manner, the grille body 2 is obtained wherein the plating layer 3 having the chemical plating layer 15 and the electroplating layer 16 is formed only at the to-be-plated portion substantially in the same manner as the first embodiment.

The present embodiment basically demonstrates effects similar to those of the first embodiment. In addition, differing from the first to third embodiments in which the resist coating was applied or injected onto the unornamental surface, in the present embodiment, as a result of forming the notch 42 in the chemical plating layer 15 with the cutting tool 41, the electrical continuity of the chemical plating layer 15 is partially isolated when forming the electroplating layer 16. Consequently, the resist coating is not used at all, thus preventing the plating solution from being contaminated and achieving a reduction in cost.

Next, an explanation is provided of a fifth embodiment of the present invention focusing on differences from each of the previous embodiments referring to FIG. 28 through 31.

Figure 31:
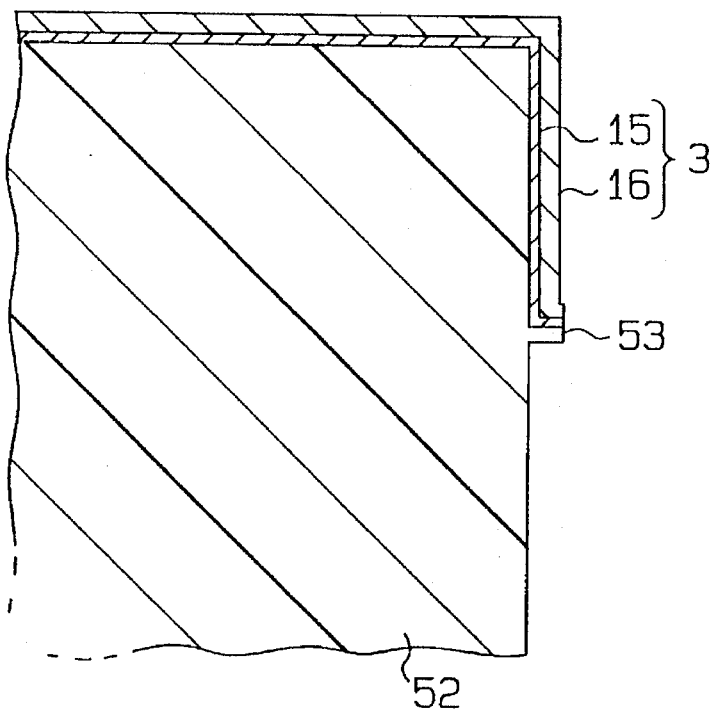
FIG. 31 is a cross-sectional view of a grille body showing the state in which electroplating has been performed on the unornamental surface in the fifth embodiment.

As shown in FIG. 31, the fifth embodiment differs considerably from the first through third embodiments with respect to not using the resist coating on the unornamental surface of a grille body 52. In addition, it also differs considerably from the fourth embodiment with respect to a ridge 53. The ridge 53 has a rectangular cross-section, is formed continuously and in the shape of a loop on the unornamental surface of grille body 52 at the boundary between the to-be-plated portion and the to-be-unplated portion.

Figure 29:
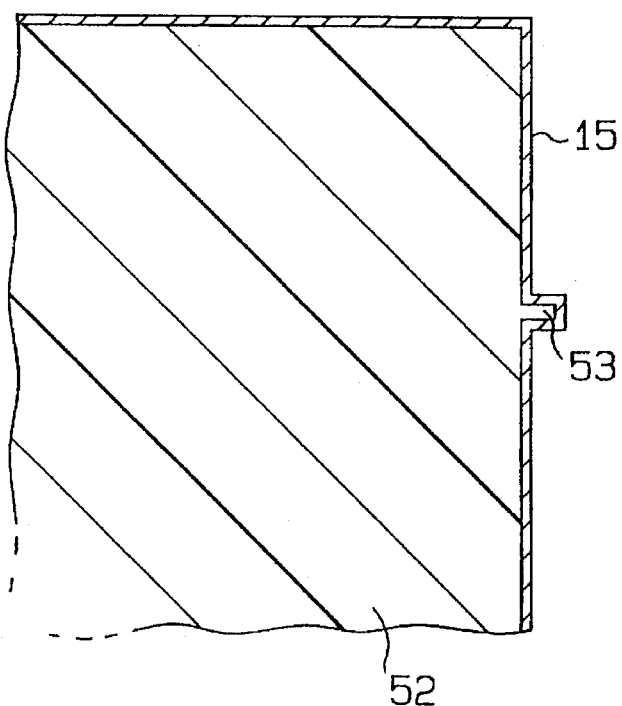
FIG. 29 is a cross-sectional view of a grille body showing the state in which a chemical plating layer has been formed on the unornamental surface in the fifth embodiment.
Figure 30:
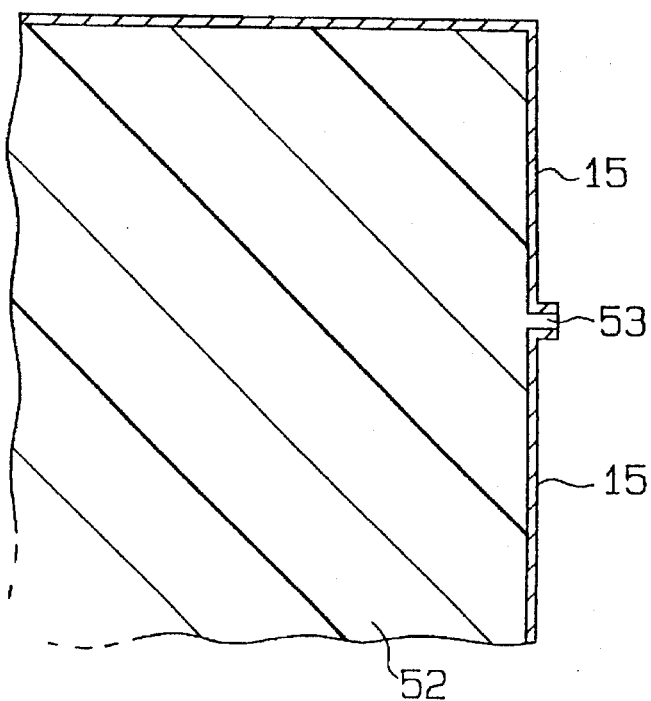
FIG. 30 is a cross-sectional view of a grille body showing the state in which the chemical layer on the ridge has been removed in the fifth embodiment.

In this embodiment, the grille body 52 is first obtained by using a predetermined mold (not shown). The grille body 52 is provided with the groove 11 on the ornamental surface side like in the first embodiment, and the ridge 53 shown in FIG. 28 on the unornamental surface side. Next, the grille body 52 is immersed in the chemical plating solution to perform chemical plating. At this time, the bottom 11a of groove 11 is not plated, while the chemical plating layer 15 is formed on all other portions, including the ridge 53. Thus, the chemical plating layer 15 is formed over the entire unornamental surface of grille body 52 as shown in FIG. 29. Subsequently, the chemical plating layer 15 on the ridge 53 is cut away using a cutting tool as shown in FIG. 30.

Moreover, the resulting grille body 52 is subjected to electroplating. Since current does not pass through the chemical plating layer 15 formed at the to-be-unplated portion, as shown in FIG. 31, the electroplating layer 16 is not formed on its upper surface, but rather is dissolved by the electroplating solution. In addition, the electroplating layer 16 having a multi-layer structure is formed on the surface of chemical plating layer 15 at the to-be-plated portion. Thus, as substantially similar to the first embodiment, the grille body 52 is obtained, which has the plating layer 3 having the chemical plating layer 15 and the electroplating layer 16 only formed at the to-be-plated portion.

The present embodiment also basically demonstrates effects similar to the first embodiment. In addition, differing from the first through third embodiments in which a resist coating was applied or injected onto the unornamental surface, as a result of cutting away the chemical plating layer 15 on the ridge 53, the electrical continuity of the chemical plating layer was partially interrupted during formation of the electroplating layer 16. Thus, similar to the fourth embodiment, contamination of the plating solution is prevented, thereby achieving a reduction in cost.

The present invention is not limited to each of the abovementioned embodiments, but may also be carried out in the following manner by suitably altering a portion of the constitution within a range that does not depart from the gist of the invention.

Figure 32:
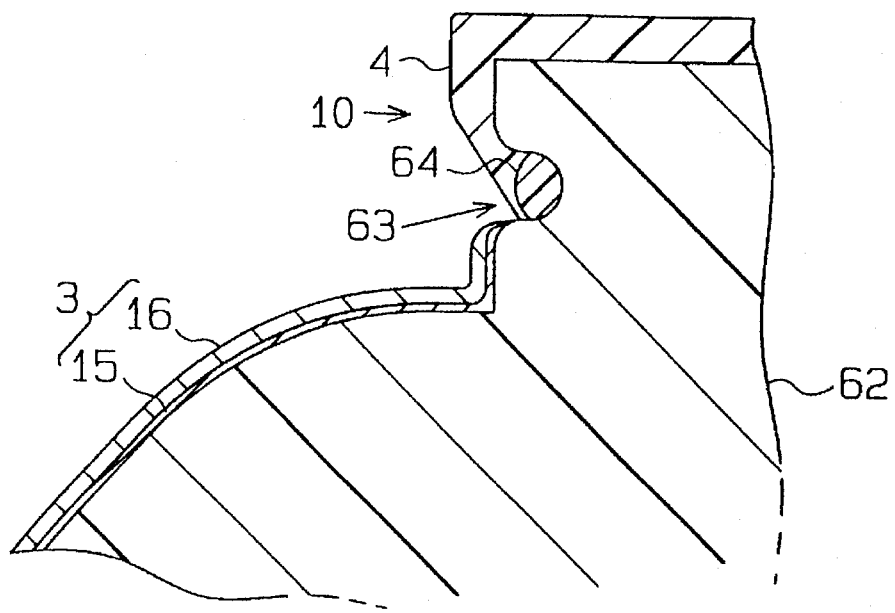
FIG. 32 shows in partial cross-section a portion of the main partition of the ornamental surface of a front grille in an another embodiment of the present invention.
Figure 33:
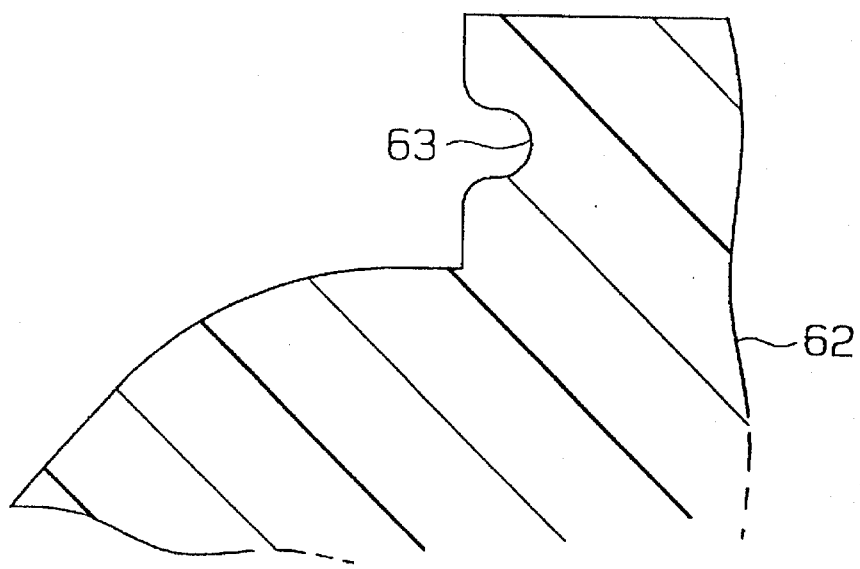
FIG. 33 shows in partial cross-section a portion of the main partition of the ornamental surface of a grille body in the another embodiment.

(1) The first through fifth embodiments have the grooves 11 having the v-shaped cross-sections and formed in the ornamental surface of grille bodies 2, 32 and 52, respectively. However, instead of the groove 11, a groove 63 having a nearly U-shaped cross-section may also be formed in the ornamental surface of grille body 62 as shown in FIG. 32. In this case, there is formed the grille body 62 having the groove 63 arranged in the shape of a loop on the ornamental surface as shown in FIG. 33. At this time, any of the structures of the first through fifth embodiments can be applied for the unornamental surface.

Figure 34:
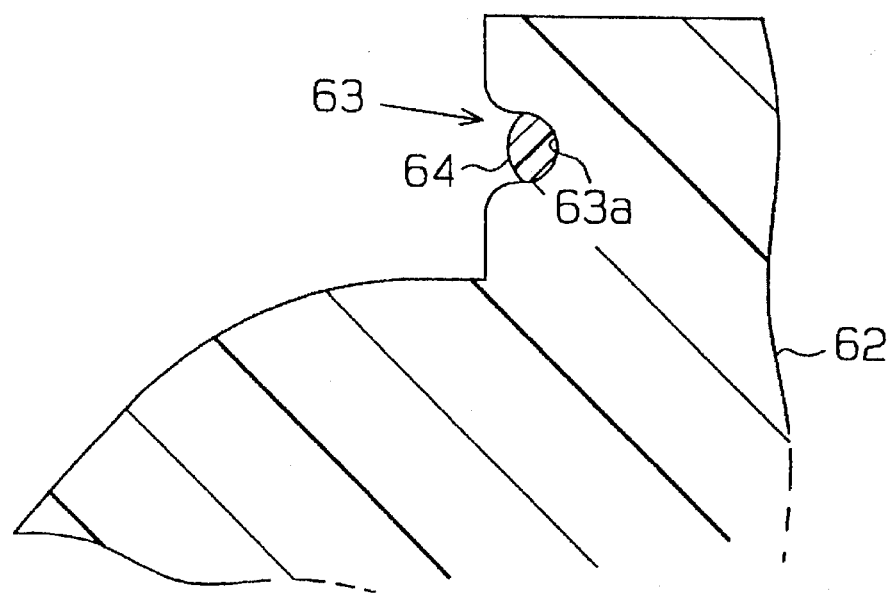
FIG. 34 shows in partial cross-section the state in which a resist layer is formed in the groove of the ornamental surface of a grille body in the another embodiment.
Figure 35:
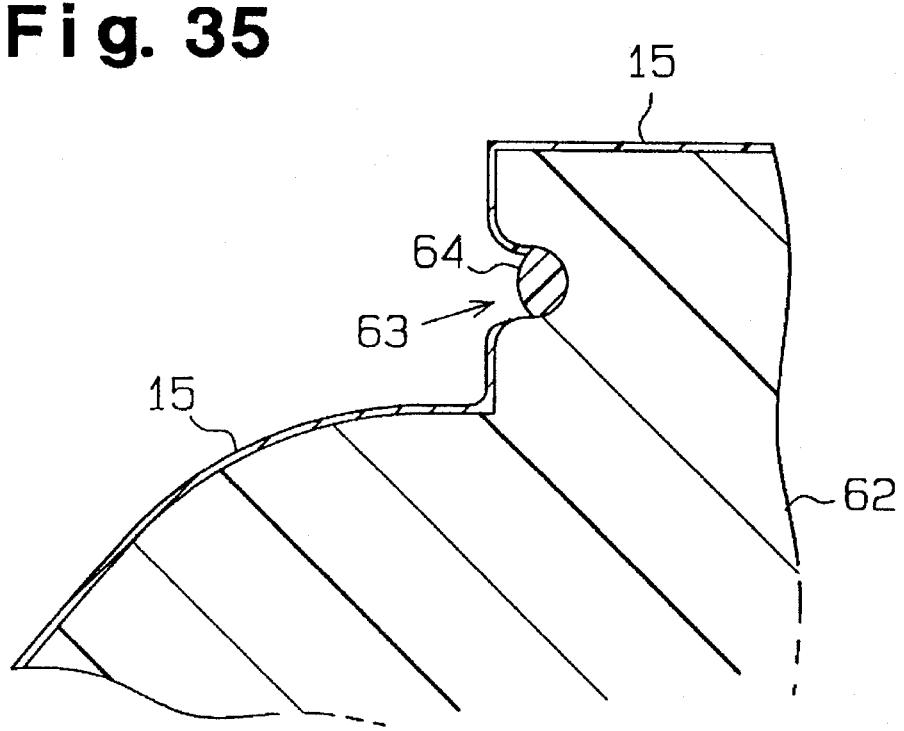
FIG. 35 is a partial cross-sectional view of a grille body showing the state in which chemical plating has been performed on a grille body on which a resist layer has been formed in the another embodiment.
Figure 36:
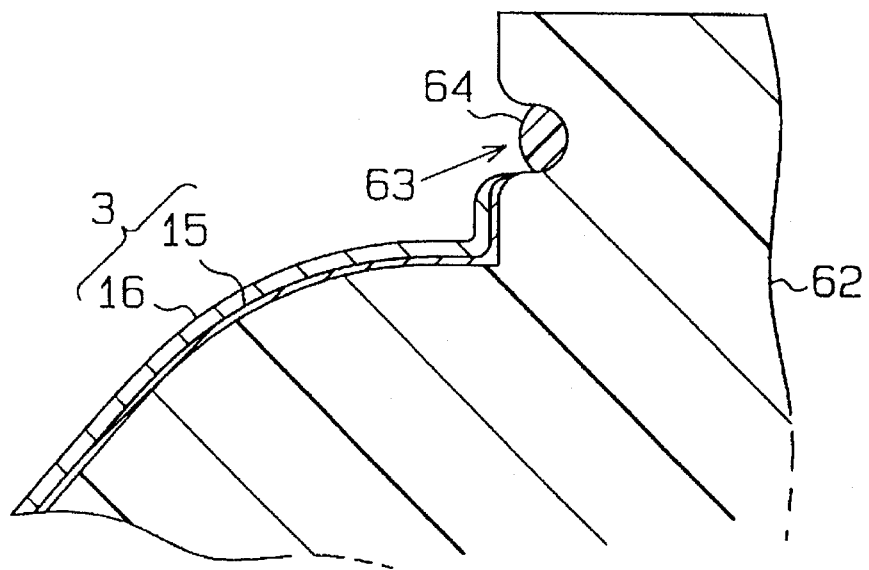
FIG. 36 is a partial cross-sectional view of a grille body showing the state in which electroplating has been performed on the ornamental surface in the another embodiment.

As shown in FIG. 34, a resist layer 64 is formed in the shape of a loop by injecting a resist coating into the bottom 63a of groove 63. Next, the grille body 62 is immersed in a chemical plating solution to perform chemical plating. At this time, on the ornamental surface, the resist layer 64 is not plated, but rather the chemical plating layer 15 is formed on all portions excluding that resist layer 64. Subsequently, the grille body 62 is subjected to electroplating. Then, as shown in FIG. 36, since current does not pass through the chemical plating layer 15 formed on the to-be-unplated portion, the electroplating layer 16 is not formed, but rather the chemical plating layer 15 is dissolved by the electroplating solution. In addition, the electroplating layer 16 having a multi-layer structure is formed on the surface of chemical plating layer 15 at the to-be-plated portion.

Thereafter, as shown in FIG. 32, the coating layer 4 is formed by coating the portion of which the plating layer 3 is not formed. In this case, the resist layer 64 is covered with the coating layer 4 and embedded within the groove 63, thus resulting in the plating layer 3 being separated inside the groove 63. Namely, a boundary is established. Consequently, in comparison with the case of the boundary of plating layer 3 and coating layer 4 being separated by the groove 11, favorable parting is obtained the less the degree of inferiority, thereby maintaining favorable appearance and quality.

In addition, since there is no need to form a V-shaped groove in the ornamental surface, forming of the mold is simplified even more, thereby enabling its production cost to be reduced.

Alternatively, the U-shaped groove 63 may be formed in the ornamental surface of grille body 62, and the groove 11 having the V-shaped cross-section may be formed in the unornamental surface. In other words, the structure of the grooves in the ornamental and unornamental surfaces of the third embodiment may be inverted. In this case as well, forming of the mold can be simplified.

Figure 37:
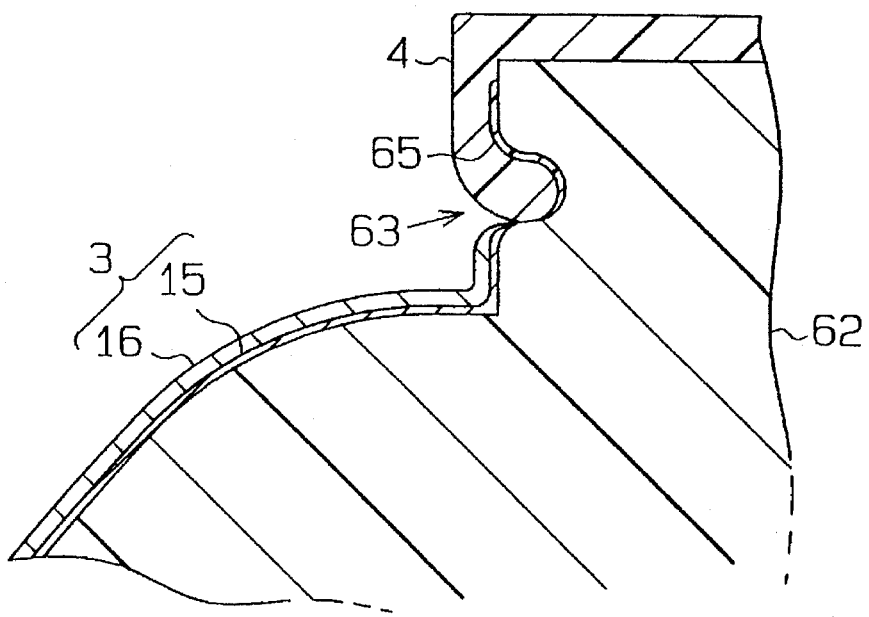
FIG. 37 shows in partial cross-section a front grille in the case of forming a resist layer in a groove and its vicinity in yet another embodiment.

(2) In the above-mentioned modification embodiment (1), the resist layer 64 is formed by injecting the resist coating into the bottom 63a of groove 63. Instead, as shown in FIG. 37, a substantially band-shaped resist layer 65 may be formed by spray coating along the groove 63. In this case, since the coating layer 4 is overcoated on the resist layer 65, there is no decrease in appearance and quality, thus resulting in effects nearly equal to those of modification embodiment (1).

(3) In the second embodiment, the resist layer 34 is formed by injecting the resist coating into the groove 33 of the unornamental surface. Instead, a band-shaped resist layer may be formed by coating the resist coating along the groove 33 in the manner of the above-mentioned modification embodiment (2).

Figure 38:
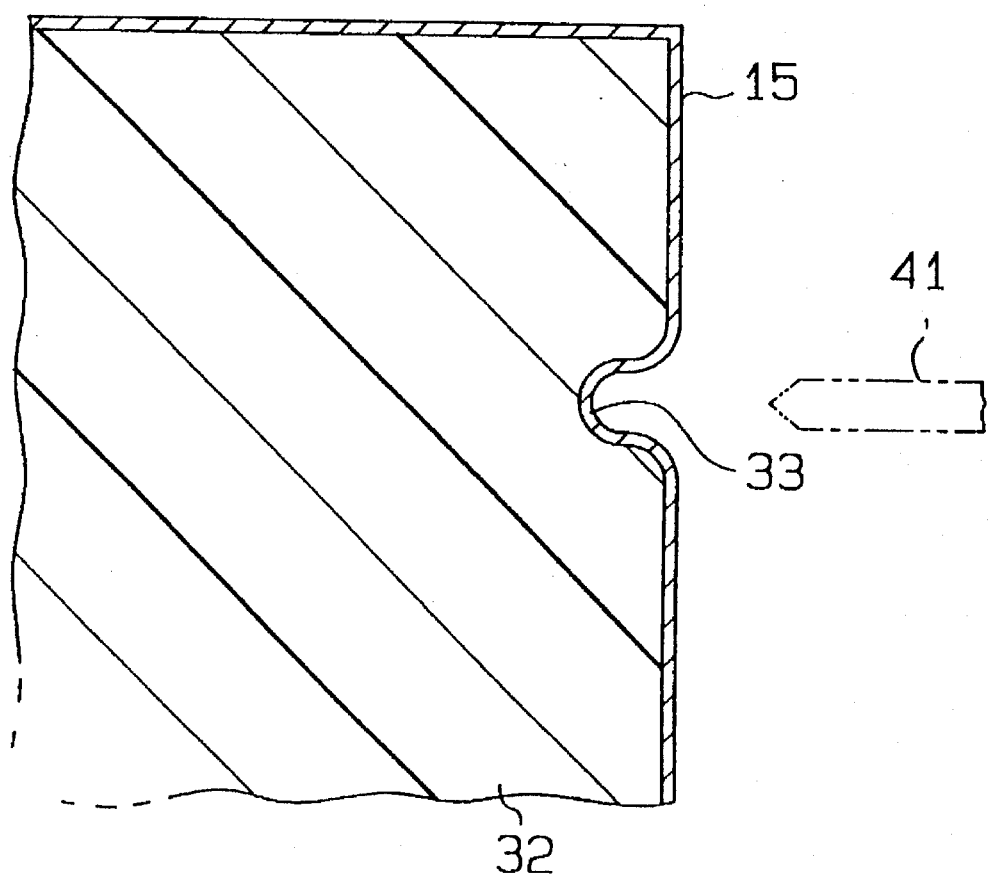
FIG. 38 is a cross-sectional view of a grille body showing the state in which a groove and a notch made with a cutting tool are combined in the yet another embodiment.

(4) In the fourth embodiment, the loop-shaped notch 42 is formed in the chemical plating layer 15, which was formed on the unornamental surface, at the boundary between the to-be-plated portion and the to-be-unplated portion by using the cutting tool 41. Instead, the above-described notch may be made on the grille body 32 having the groove 33 as shown in FIG. 38. In this variation, the chemical plating layer 15 is formed on the grille body 32 having the U-shaped groove 33 of FIG. 38. Next, a notch is made by using the cutting tool 41. In this case, since the cutting tool 41 can be guided by the inner wall of groove 33, this work can be performed easily and with high precision. In addition, in the case of having this type of constitution on the unornamental surface, the U-shaped groove 63 shown in the modification embodiments (1) and (2) may also be formed in the ornamental surface.

(5) In the first through fifth embodiments as well as modification embodiments (1) through (4), the groove 11, resist coating 31, groove 33, resist coatings 34, 64 and 65, notch 42 and ridge 53 are all formed in the shape of a loop on only the respectively formed ornamental surface or unornamental surface. Instead, these grooves and layers may be arbitrarily combined to form a loop-shaped boundary. For example, in the example shown in FIG. 39, a boundary of a single closed curve is formed by the V-shaped groove 11 on the ornamental surface and the U-shaped groove 33 on the unornamental surface.

Figure 39:
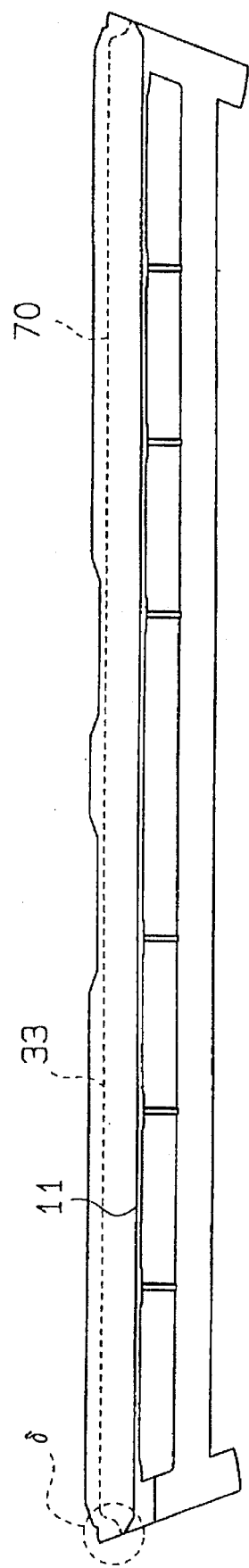
FIG. 39(a) is a front view of the grille having a substantially ring-shaped groove in the yet another embodiment.
FIG. 39(b) is a fragmentary enlarged perspective view showing the γ section of FIG. 39(a)
Figure 39:
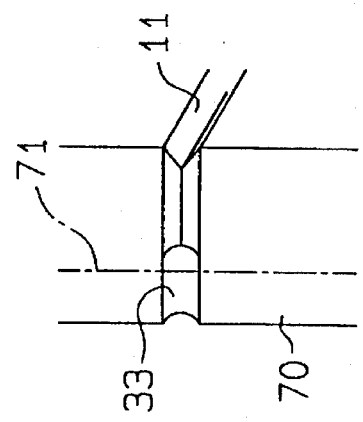

A grille body 70 is formed by a mold (not shown) including a fixed die and a movable die like in the above embodiments. A parting line 71 of the mold is set at the side surfaces of the grille body 70 as shown in FIG. 39 (b). A boundary of the V-shaped groove 11 and the U-shaped groove 33 is biased toward the unornamental surface from the parting line 71. Consequently, the V-shaped groove 11 does not go across the parting line 71, but the U-shaped groove does. This facilitates to make the mold.

(6) The present invention may also be embodied in various automotive parts other than vehicular front grille 1, examples of which include outer covers for door mirror brackets, back panels, louvers, pillar garnish and quarter vents. Further, the present invention may also embody other resin products having plating layers and coating layers without being limited to these resin products.

(7) Various resins other than ABS resin may be used as the base material of grille body 2, examples of which include polypropylene, polyphenylene oxide, polyamide, polysulfone and polyester.

(8) The chemical plating layer 15 may be formed by a metal other than nickel such as copper. In addition, a multi-layer or single layer electroplating layer may be formed by employing three types of metals other than copper, nickel and chromium as the materials of electroplating layer 16.

(9) The coating layer 4 may be omitted in each of the above-mentioned embodiments and modification embodiments.

(10) In each of the above-mentioned embodiments and modification embodiments, the chemical plating layer 15 may be dissolved at the to-be-unplated portion using a prescribed solution such as an aqueous ammonia solution at the stage prior to forming the strike plating layer. In this case, since dissolving of unnecessary chemical plating layer 15 in the plating solution can be prevented in the following electroplating process, contamination of the plating solution can be prevented in advance.

Next, an explanation is provided regarding the resist coating used in each of the above-mentioned embodiments.

The resist coating has resistance to the acidic etching solution and plating solution, and has as its main component a mixed polymer including 50 to 95% by weight of a copolymer of vinyl chloride and vinyl acetate, and 50 to 5% by weight of a copolymer of acrylic and styrene. In addition, when using this coating, it is best to blend an equal weight of thinner with the primary agent containing 17% by weight of the polymer and 83% by weight of solvent.

Denka vinyl #1000AKT (86% by weight of vinyl chloride and 14% by weight of vinyl acetate), manufactured by Denki Kagaku Kogyo K.K., was used as the vinyl chloride/vinyl acetate copolymer. In addition, Acrydick A-165 (50% by weight of styrene and 50% by weight of MMA50), manufactured by Dainippon Ink and Chemicals, Inc., was used as the acrylic/styrene copolymer. Moreover, the solvent that was used contained 38% by weight of toluene, 5% by weight of methyl isobutyl ketone (MIBK), 35% by weight of ethyl acetate and 22% by weight of cyclohexanone. As the thinner used with the above copolymers contained 49% by weight of methyl ethyl ketone (MEK), 29% by weight of toluene, 11% by weight of butyl acetate, 6% by weight of MIBK and 5% by weight of Cellosolve acetate.

In order to evaluate the properties of the coating, samples of the present embodiments 1 to 4 (Examples 1 to 4) and comparative samples 1 to 3 (Comparative examples 1 to 3) were prepared while changing the blending ratios of the vinyl chloride/vinyl acetate copolymer and acrylic/styrene copolymer. The results of evaluation are shown in Table 1.

TABLE 1

|  | Comp. Ex. 1 | Ex. 1 | Ex. 2 | Ex. 3 | Ex. 4 | Comp. Ex. 2 | Comp. Ex. 3 |
| --- | --- | --- | --- | --- | --- | --- | --- |
| Vinyl chloride/vinyl acetate | 100 | 94 | 82 | 70 | 50 | 30 | 0 |
| Acrylic/styrene | 0 | 6 | 18 | 30 | 50 | 70 | 100 |
| Acid resistance | Δ | o | ◎ | ◎ | o | Δ | x |
| Parting appearance | o | o | o | o | o | Δ | x |
| Absence of discoloration | ◎ | ◎ | ◎ | ◎ | o | Δ | x |
| Coatability | x | o | ◎ | ◎ | o | o | x |
| Moisture resistance | x | o | ◎ | ◎ | ◎ | Δ | x |

◎ ... Extremely good
Δ ... Somewhat poor
o ... Somewhat good
x ... Poor

It should be noted that the acid resistance of the resist coating was evaluated by visually evaluating the appearance of a resin sample to which the resist coating had been applied following plating and acid treatment. In addition, parting appearance and the absence of discoloration were evaluated visually after plating the sample. Moreover, coatability was evaluated visually during coating of the sample with the resist coating. Moisture resistance was evaluated using a prescribed peeling test after exposing the sample to water and drying. In the peeling test, the coating layer was divided into 100 sections by making a plurality of notches in the coating layer of the resist coating on the sample in the form of a lattice. After affixing an adhesive tape to the divided coating layer, the tape was pulled off.

This procedure was repeated 10 times for each sample. Moisture resistance was then evaluated according to the number of times when peeling occurred.

In the above table, the evaluation results are shown using four types of symbols. Namely, ◎ represents an evaluation of "extremely good", O "somewhat good", Δ "somewhat poor" and x "poor". The units for values representing the blending ratios are % by weight.

As is clear from Table 1, in the case of using the resist coatings of the first through third embodiments, excellent acid resistance, coatability and moisture resistance are obtained. These embodiments have as their main component a mixed polymer containing 50 to 95% by weight of a copolymer of vinyl chloride and vinyl acetate, and 50 to 5% by weight of a copolymer containing acrylic and styrene. In addition, parting with the adjacent plating layer is also favorable, since no irregular border lines are formed. Moreover, according to the above-mentioned composition, the degree of discoloration over time is also low. The main component preferably includes the mixture of 70 to 85% by weight of the vinyl chloride and vinyl acetate copolymer and 30 to 15% by weight of the acrylic and styrene copolymer. This further improves the acid resistance, coatability and moisture resistance.

In contrast, with respect to the coatings of comparative samples 1 to 3 having compositions outside the scope of the present embodiments, in the case of the ratio of vinyl chloride/vinyl acetate copolymer being excessively large, the coating dries rapidly resulting in inferior coatability. For this reason, a coating layer is not formed, which ends up resulting in somewhat inferior resistance. In addition, in the case of forming an overcoating layer on the resist layer and exposing to moisture, blisters occur, thus causing moisture resistance to also be inferior.

Next, an explanation is provided of an application example in which a resist coating having the above-mentioned composition was applied to an automobile mark plate. Embodiment sample 2 (Example 2) was used in this example. In that sample, the blending ratio of vinyl chloride/vinyl acetate copolymer and acrylic/styrene copolymer was 82:18.

Figure 40:
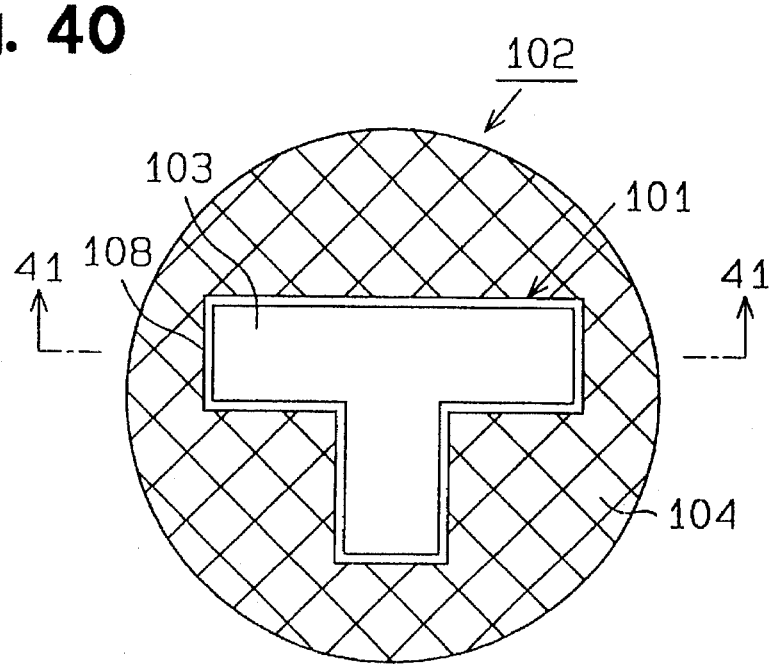
FIG. 40 is a plan view showing a mark plate embodying the present invention.
Figure 41:
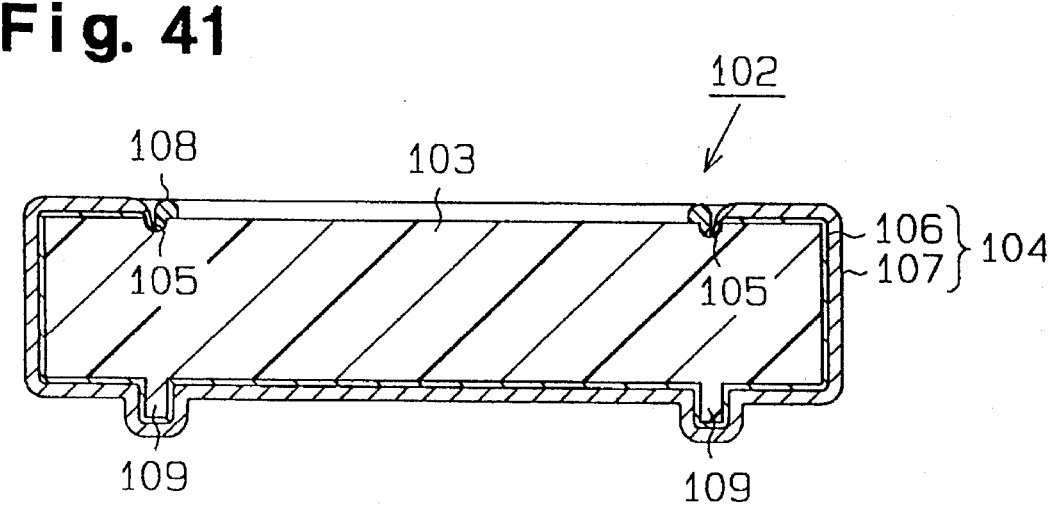
FIG. 41 is a cross-sectional view taken along the line 41—41 of FIG. 40.

As shown in FIGS. 40 and 41, a mark plate 102 was attached at a predetermined location on the automobile. A mark 101 in the shape of the letter "T" is formed on the surface of mark plate 102. The mark plate 102 has a disk-like form and a mark plate body 103 made of ABS resin base material. The body 103 is provided with a partially formed plating layer 104 (the portion indicated with the mesh pattern in FIG. 40). In order to form the letter "T" section on the surface of the mark plate body 103, together with forming a closed loop along the contour of the letter "T", a groove 105 was formed having a substantially U-shaped cross-section. The surface of mark plate body 103 is exposed at the portion surrounded by this groove 105.

The plating layer 104 includes a chemical plating layer 106 and an electroplating layer 107. In the present embodiment, the chemical plating layer 106 is formed of nickel to a thickness of about 0.3 to 0.4 μm. The electroplating layer 107 is formed of three types of metal including copper, nickel and chromium to a thickness of about 20 to 50 μm, and demonstrates a multi-layer structure. A resist layer 108 is arranged so as to form a closed loop along the groove 105 to surround the portion on which the plating layer 104 is not formed.

Next, an explanation is provided of a process for producing the mark plate 102.

Figure 42:
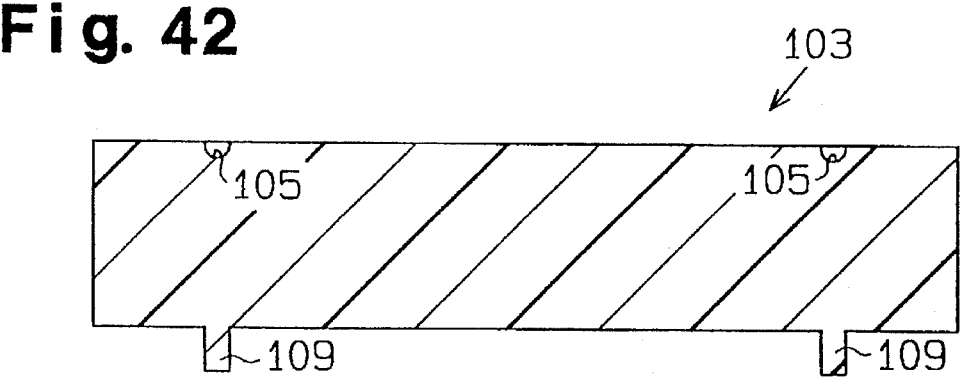
FIG. 42 shows in cross-section the mark plate body.

First, as shown in FIG. 42, the mark plate body 103 having the groove 105 is formed in accordance with known molding methods. At this time, a projection 109 is formed integrally with the mark plate body 103 on the rear surface of mark plate body 103.

Figure 43:
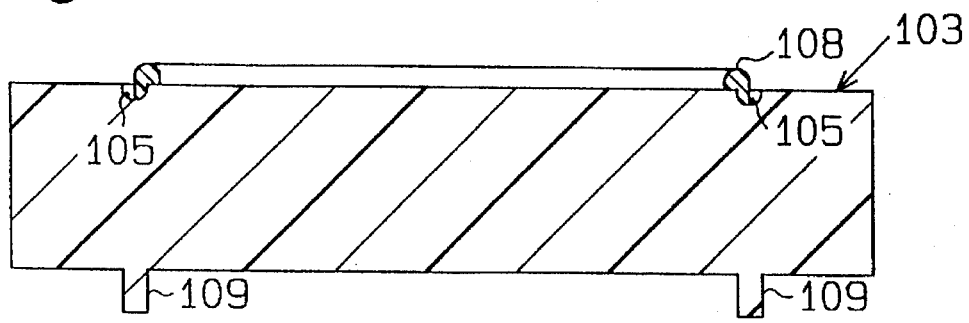
FIG. 43 shows in cross-section the state in which a resist layer is formed on a mark plate body.
Figure 44:
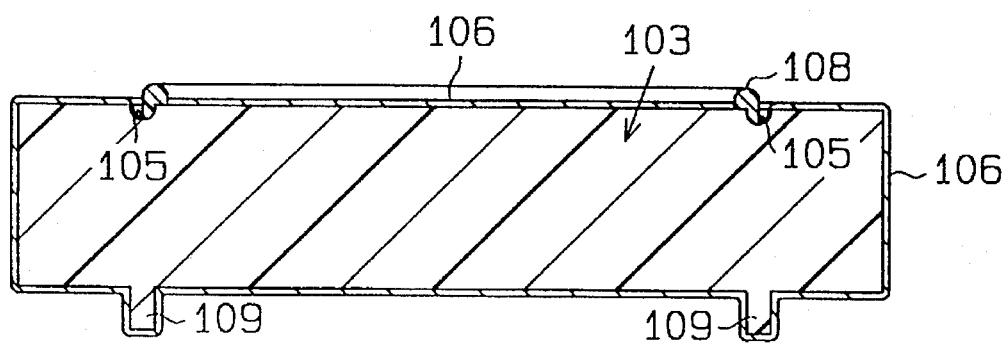
FIG. 44 shows in cross-section the state in which a chemical plating layer has been formed on the mark plate body.

Next, as shown in FIG. 43, the resist coating is applied along the inner circumference of the groove 105 to form the resist layer 108 in the form of a closed loop. The resist layer 108 has an inner portion located inside the bottom of the groove 105 and an outer portion located outside the groove. This mark plate body 103 is then immersed in a chemical plating solution to perform chemical plating. The chemical plating layer 106 shown in FIG. 44 is formed on the surface of mark plate body 103 except on the resist layer 108. In addition, although the plating solution for chemical plating is acidic, the resist layer 108 does not dissolve in the plating solution in accordance with the properties of the resist coating.

Figure 45:
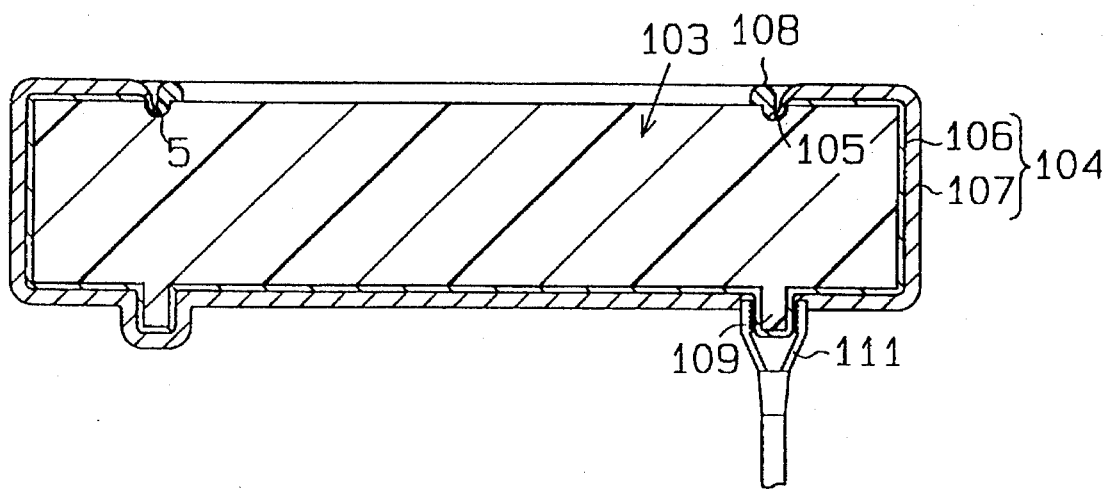
FIG. 45 shows in cross-section the state in which an electroplating layer has been formed on the chemical plating layer.

Subsequently, as shown in FIG. 45, the mark plate body 103, on which the chemical plating layer 106 is formed, is subjected to electroplating. In this case, together with immersing the body 103 in a predetermined electroplating solution for a plurality of times, current is passed through the to-be-plated portion. In the present embodiment, current is passed through the surface of body 103 by attaching a clip 111 to the projection 109. Then, the chemical plating layer 106 present on the inside of the groove 105 that does not require plating is electrically isolated by the resist layer 108. Since current does not pass through this layer, it is dissolved by the acidic electroplating solution. In addition, the electroplating layer 107 having the multi-layer structure is formed on the surface of chemical plating layer 106 at the to-be-plated portion. Thus, a mark plate is obtained wherein the chemical plating layer 106 and the electroplating layer 107 are formed only at the "T" section.

In the present embodiment, since the coating has excellent resistance, coatability and moisture resistance, favorable parting can be formed with the adjacent plating layer, thus enabling the forming of a mark plate superior in both appearance and weather resistance.

Next, an explanation is provided of another application example of a mark plate in which the resist coating is applied. The resist coating and mark plate body 103 used in this modification embodiment are identical to those used in the above-mentioned embodiment.

Figure 46:
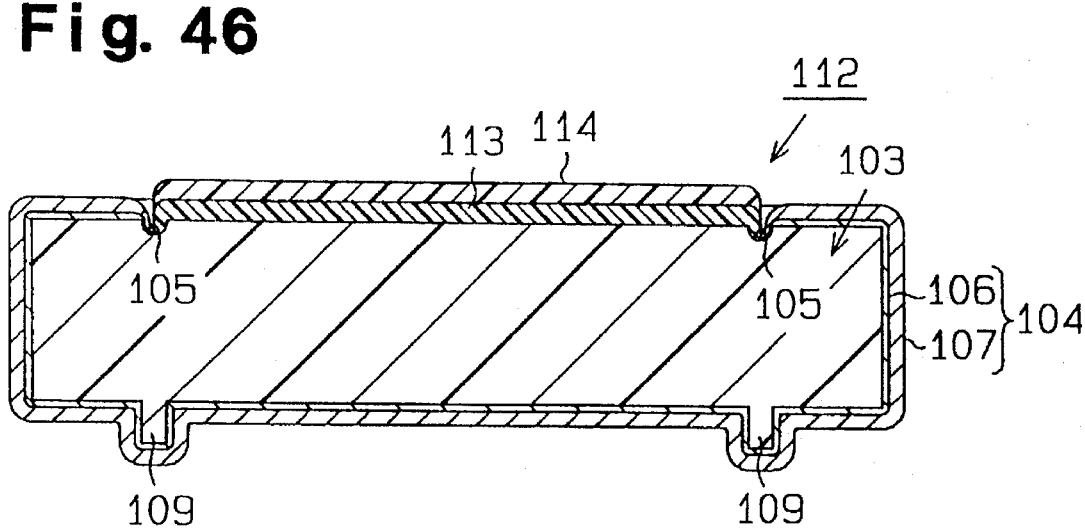
FIG. 46 shows in cross-section a mark plate in an another embodiment of the present invention.

As shown in FIG. 46, a mark plate 112 of the present embodiment is provided with a plating layer 104 partially formed on the surface of mark plate body 103. A resist layer 113 is coated on the portion surrounded by the groove 105 on the surface of mark plate body 103. An overcoating layer 114 is coated on the upper surface of that resist layer 113. The plating layer 104 formed on the outer surface of body 103 includes the chemical plating layer 106 and the electroplating layer 107 in the same manner as the above-mentioned second embodiment with the exception of the overcoating layer 114.

Figure 47:
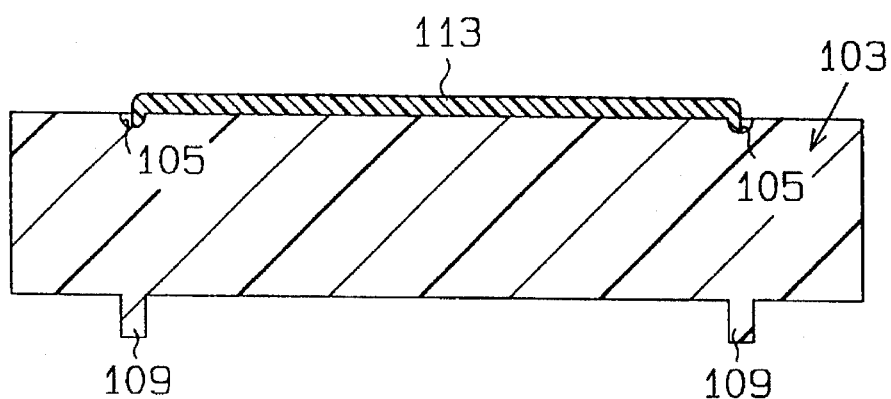
FIG. 47 shows in cross-section the state in which a resist layer has been formed on the body of the mark plate of FIG. 45.

In the production of the mark plate 112, as shown in FIG. 47, the mark plate body 103 having the groove 105 is first formed in accordance with known molding methods, and the resist coating is applied to the inside surface of the groove 105. Then, the resist layer 113 is formed. Since the resist coating used at this time has favorable coatability as previously described, an even coating is easily obtained.

Figure 48:
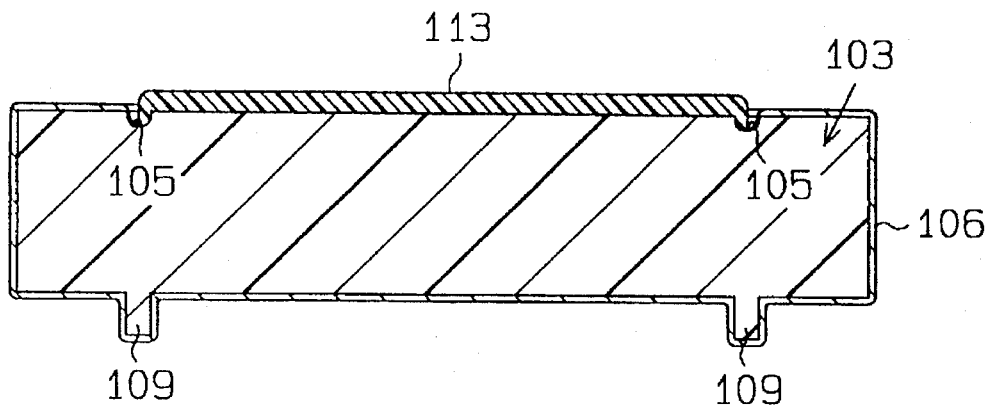
FIG. 48 shows in cross-section the state in which a chemical plating layer has been formed on the mark plate body of FIG. 46.

Next, this mark plate body 103 is immersed in a chemical plating solution to perform chemical plating. At this time, as shown in FIG. 48, the chemical plating layer 106 is formed on the surface of mark plate body 103 except for on the resist layer 113. Although the plating solution for chemical plating is acidic, due to the properties of the resist coating, the resist layer 113 is not dissolved in the plating solution.

Figure 49:
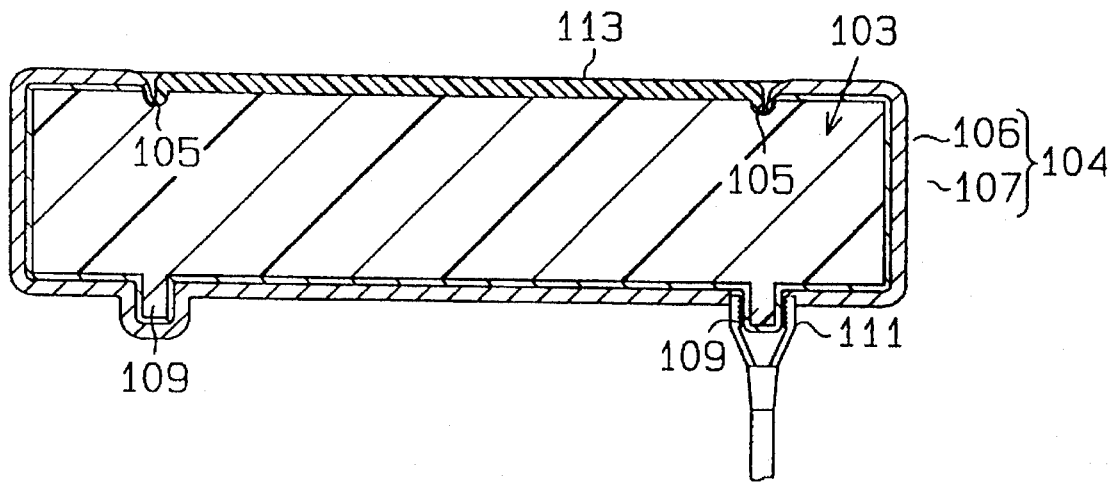
FIG. 49 shows in cross-section the state in which an electroplating layer is formed on the chemical plating layer of FIG. 48.

Subsequently, as shown in FIG. 49, the mark plate body 103, on which is formed the chemical plating layer 106, is subjected to electroplating in the same manner as the above-mentioned embodiment. At this time, the resist layer 113 formed on the to-be-unplated portion is not dissolved by the acidic electroplating solution. Since current does not pass through the resist layer 113, the electroplating layer 107 is not formed on it. On the other hand, the electroplating layer 107 having a multi-layer structure is formed on the surface of chemical plating layer 106 at the to-be-plated portion.

Thus, a mark plate is obtained wherein the resist layer 113 is formed only at the "T" section, while the chemical plating layer 106 and electroplating layer 107 are formed at all other portions.

Figure 50:
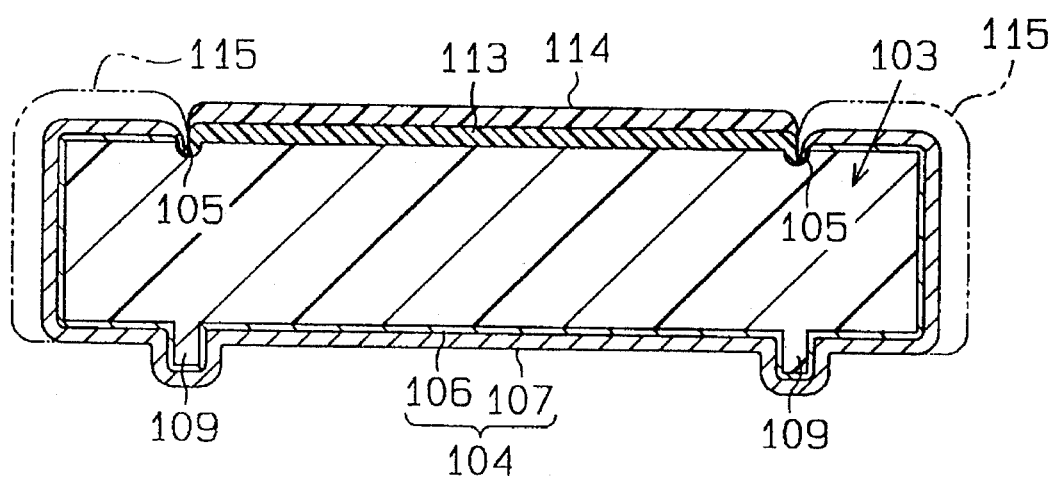
FIG. 50 shows in cross-section the state in which an overcoating layer is coated onto a resist layer of the mark plate body of FIG. 49.

Next, the portion of the coating layer 104 is covered with a mask 115 as shown in FIG. 50. This mask 115 is a metal plate having a thickness of several millimeter, and has a shape which approximates the mark plate 112. An opening in the shape of the letter "T" is formed in the mask 115 for forming the overcoating layer 114. After this mask 115 is attached on the body 103, spray coating is performed toward the surface of body 103 exposed from the opening. Consequently, the overcoating layer 114 is formed on the resist layer 113. Thereafter, the mark plate 112 shown in FIG. 51 is obtained when the mask 115 is removed.

In the present embodiment, since the resist layer 113 is formed by using the embodiment sample of a resist coating, the body 103 and overcoating layer 114 are strongly adhered. Accordingly, even if the mark plate 112 is exposed to moisture, there is no formation of blisters enabling the obtaining of the mark plate 112 having excellent moisture resistance.

Next, an explanation is provided of still another application example of a mark plate to which the resist coating is applied. The resist coating and mark plate body 103 used are identical to those in the above-mentioned application example.

Figure 51:
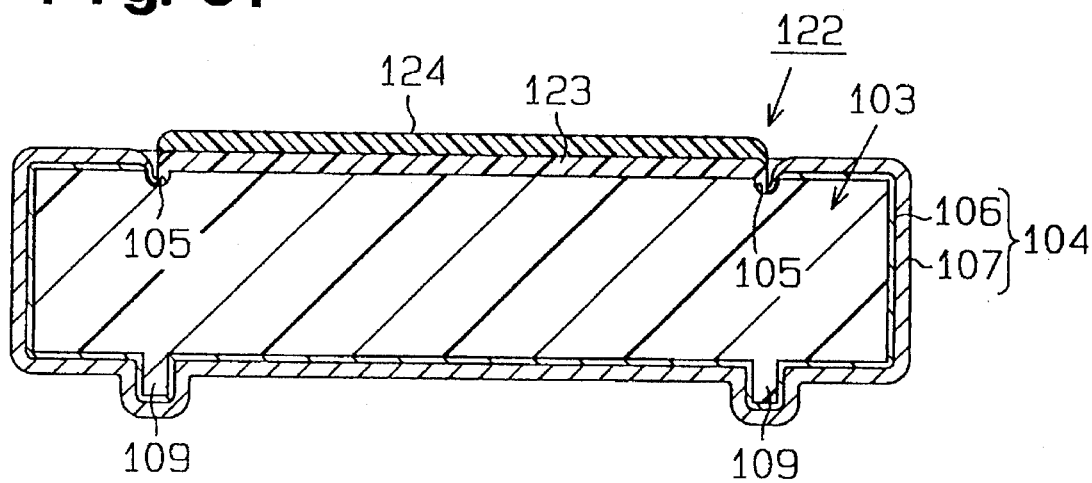
FIG. 51 shows in cross-section a mark plate in a yet another embodiment of the present invention.

A mark plate 122 shown in FIG. 51 has the plating layer 104 partially formed on the surface of mark plate body 103. A coating layer 123 is applied to the portion on the surface of mark plate body 103 surrounded by the groove 105. A transparent resist layer 124 is coated onto the surface of the coating layer 123. In addition, the plating layer 104 includes the chemical plating layer 106 and the electroplating layer 107 like in the second and third embodiments, and is formed on the front, rear and side surfaces of body 103 with the exception of the coating layer 124.

Figure 52:
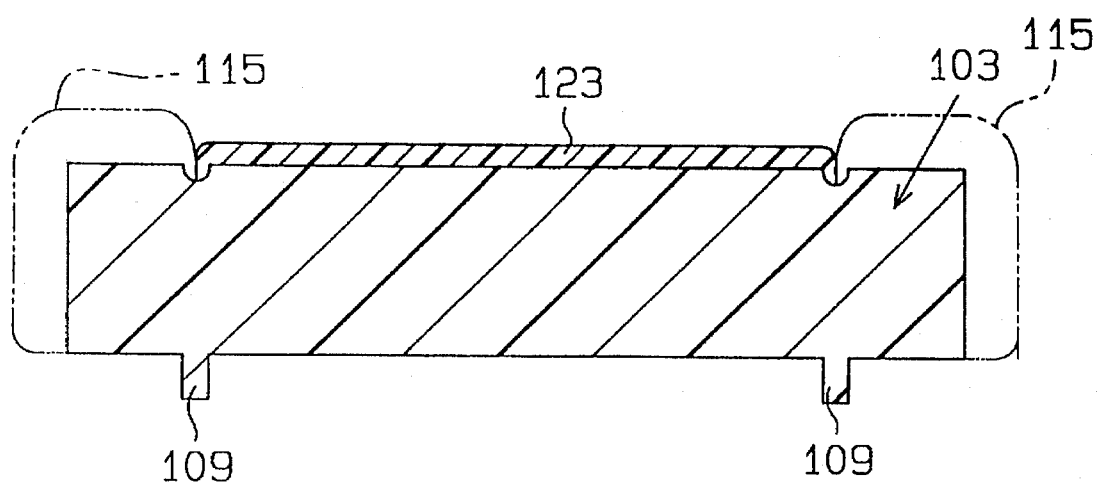
FIG. 52 shows in cross-section the state in which a coating layer is formed on the body of the mark plate of FIG. 51.

In the production of the mark plate 122, the mark plate body 103 having the groove 105 is first formed in accordance with a known molding method as shown in FIG. 52. The to-be-plated portion of body 103 is covered with the mask 115. A coating for overcoating is applied on the inside surface of the groove 105 through the opening of the mask. Consequently, the coating layer 123 shown in FIG. 52 is formed.

Figure 53:
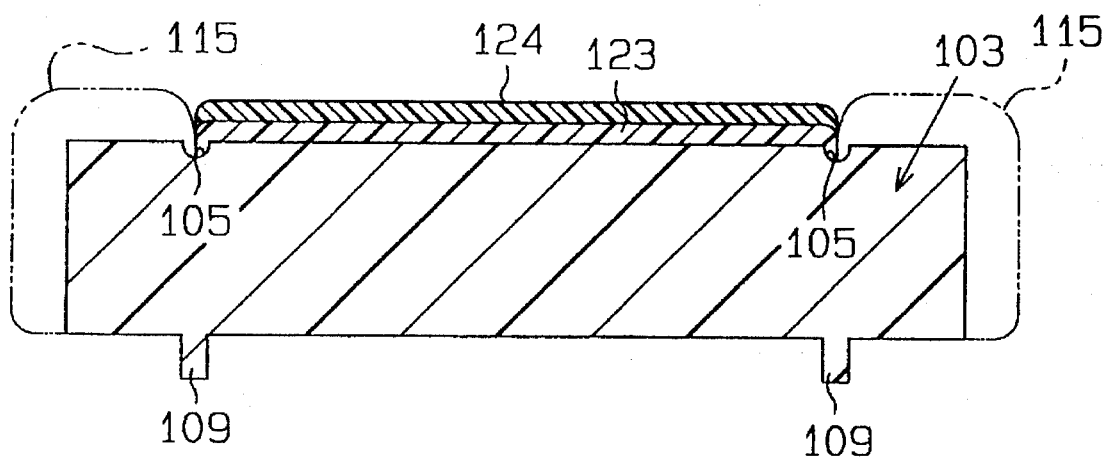
FIG. 53 shows in cross-section the state in which a resist layer is formed on the coating layer of FIG. 52.
Figure 54:
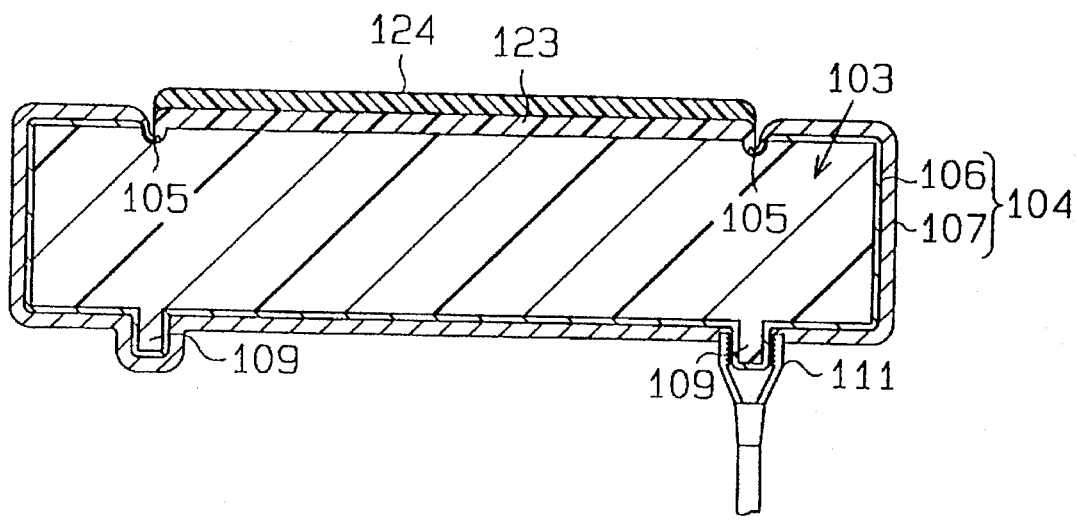
FIG. 54 shows in cross-section the state in which a plating layer is formed on the mark plate body of FIG. 51; and, FIG. 55 shows cross-section a variation of the mark plate embodying the present invention.

Subsequently, as shown in FIG. 53, resist coating is applied to the coating layer 123 to form the resist layer 124. As shown in FIG. 54, the mark plate body 103 is then immersed in a chemical plating solution to perform chemical plating, after which electroplating is performed. At this time, chemical plating and electroplating are not performed on the resist layer 124, but rather the plating layer 104 having the chemical plating layer 106 and the electroplating layer 107 is formed on all other surfaces of mark plate body 103.

Although each of the plating solutions is acidic, the resist layer 124 is not dissolved in the plating solutions due to the properties of the resist coating. Since the coating layer 123 is covered with the resist layer 124, it is also not dissolved. Thus, the obtained mark plate 122 has the chemical plating layer 106 and the electroplating layer 107 formed around the "T" section, and has the coating layer 123 and the resist layer 124 formed on the inside of the "T" section.

In the present embodiment, in addition to the effects previously described, the process of forming the coating layer 123 and resist layer 124 can be performed continuously. Thus, in comparison with the second and third embodiments in which both processes are not continuous, improved workability can be achieved. Since the coating layer 123 is covered with the transparent resist layer 124, improved ornamental can be achieved.

Figure 55:
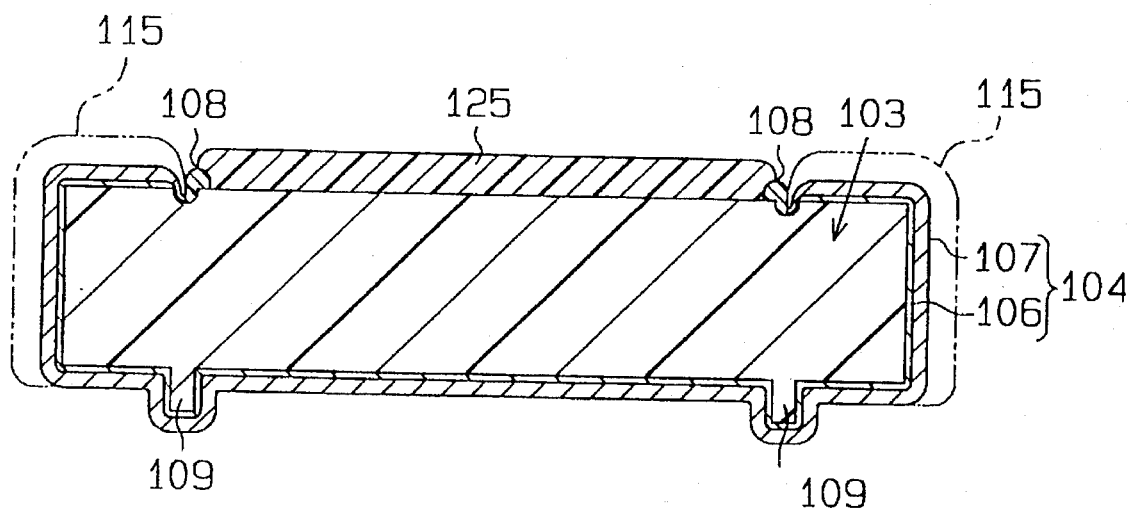

In the embodiment of FIG. 41, the surface of mark plate body 103 is exposed on the inside of resist layer 108 formed along a closed loop. The overcoating layer 125 shown in FIG. 55 may also be formed at this portion.

In addition, the solvent used for the resist coating is not particularly limited to that used in the above-mentioned embodiments. The groove 105 is not limited to have the U-shaped cross-section. A V-shaped cross-section may also be used for the groove 105. In this case, parting of the plating layer can be further improved because the chemical plating layer 106 hardly forms in the bottom of the V-shaped groove.

The groove can also be omitted in the embodiments of this mark plate. It is not necessary to form the groove 105 as well as the resist layers 108, 113 and 124 in the front surface only, but rather a single closed loop may be constituted by grooves respectively formed in the front and rear surfaces.

The body 103 may be made of resin materials such as polypropylene, polyphenylene oxide, polyamide, polysulfone and polyester.

What is claimed is:

1. A process for producing a resin product, said resin product having a body made of a resin, said body having an outer surface including an ornamental surface and an unornamental surface, a first area defined on the outer surface, and a chemical plating layer and an electroplating layer respectively formed on the first area, said process comprising the steps of:

making a first boundary along a portion of a contour of the first area located on the ornamental surface, said first boundary being selected from the group consisiting of V-shaped groove and U-shaped groove;

making a second boundary along the rest of the contour of the first area located on the unornamental surface, said second boundary being constituted by a U-shaped groove, said second boundary making step including forming a resist layer in said U-shaped groove, and said resist layer having a resistivity to a chemical plating solution for making the chemical plating layer;

forming said chemical plating layer on the outer surface of the body except a part of the first boundary and the resist layer by chemical plating the body; and selectively forming said electroplating layer on the chemical plating layer within the first area.

2. A process according to claim 1, wherein said V-shaped groove in the first boundary layer includes a bottom with the radius of curvature of less than 0.1 mm.

3. A process according to claim 1, wherein said first boundary and second boundary form a single closed loop, and said first boundary and second boundary connect each other in such a manner that the second boundary goes across a parting line of the resin product.

4. A process according to claim 1, wherein said first boundary and second boundary respectively form independently closed loops on the ornamental surface and the unornamental surface.

5. A process according to claim 1, wherein said resist layer is formed on a second area different from the first area on the outer surface of the body, and a contour of said resist layer comprises the second boundary.

6. A process according to claim 1, wherein said resist layer is formed along the contour of the first area on the unornamental surface in a form of strip.

7. A process according to claim 1 further including:

forming a coating layer on the ornamental surface except the first area after making the electroplating layer.

8. A process according to claim 1, wherein said first boundary includes a first groove having a bottom and a substantially U-shaped cross section.

9. A process according to claim 8, wherein the radius of curvature of the bottom is within the range of 1 to 1.5 mm.

10. A process according to claim 8, wherein said resist layer is formed along the first groove, and has an inner portion located inside the first groove and an outer portion located outside the first groove.

11. A process according to claim 1, wherein said resin product includes a front grille for a vehicle, said front grille has a frame located at a front surface thereof and a partition connected to the frame, said first boundary is formed along peripheries of the frame and the partition, and said second boundary is formed at a back side of the front grille.

12. A process according to claim 1, wherein said resist layer is made of a mixed polymer including 50 to 95 weight % of vinyl chloride acetate copolymer and 50 to 5 weight % of acrylate styrene copolymer.

13. A process according to claim 12, wherein said resist layer is made of a mixed polymer including 70 to 85 weight % of vinyl chloride acetate copolymer and 30 to 15 weight % of acrylate styrene copolymer.

* * * * *